United States Patent
Wu et al.

(10) Patent No.: US 11,122,560 B2
(45) Date of Patent: Sep. 14, 2021

(54) UPLINK CHANNEL TRANSMISSION METHOD AND APPARATUS, AND DOWNLINK CHANNEL TRANSMISSION METHOD AND APPARATUS

(71) Applicant: HUAWEI TECHNOLOGIES CO., LTD., Shenzhen (CN)

(72) Inventors: Zuomin Wu, Shenzhen (CN); Lei Guan, Beijing (CN); Sha Ma, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 21 days.

(21) Appl. No.: 16/672,538

(22) Filed: Nov. 4, 2019

(65) Prior Publication Data

US 2020/0068546 A1 Feb. 27, 2020

Related U.S. Application Data

(63) Continuation of application No. PCT/CN2018/084397, filed on Apr. 25, 2018.

(30) Foreign Application Priority Data

May 4, 2017 (CN) .......................... 201710308804.1

(51) Int. Cl.
  *H04W 72/04* (2009.01)
  *H04W 16/14* (2009.01)
  *H04W 72/12* (2009.01)

(52) U.S. Cl.
  CPC ......... *H04W 72/044* (2013.01); *H04W 16/14* (2013.01); *H04W 72/1263* (2013.01); *H04W 72/1278* (2013.01)

(58) Field of Classification Search
  CPC .......... H04W 72/044; H04W 72/1263; H04W 72/1278; H04W 16/14; H04L 1/0061; H04L 1/18
  See application file for complete search history.

(56) References Cited

U.S. PATENT DOCUMENTS 10,666,334 B2 * 5/2020 Xiong .................. H04L 5/0048
2012/0134275 A1 * 5/2012 Choi ..................... H04L 1/0026
370/241

(Continued)

FOREIGN PATENT DOCUMENTS

CN 102158932 A 8/2011
CN 103298121 A 9/2013

(Continued)

OTHER PUBLICATIONS

R1-165293 Ericsson,"sPDCCH search space design",3GPP TSG-RAN WG1 #85,Nanjing, P.R. China, May 23-27, 2016,total 6 pages.

Primary Examiner — Wei Zhao
(74) Attorney, Agent, or Firm — Hauptman Ham, LLP

(57) ABSTRACT

Embodiments provide a uplink channel transmission method. Scheduling information from the network device can be received by a terminal device. The scheduling information indicates uplink time-frequency resources carrying at least one uplink channel. a first uplink channel is carried on a first uplink time-frequency resource, and the first uplink time-frequency resource occupies M subbands in the N subbands in frequency domain, M≥2. The M subbands can be detected by the terminal device to determine, from the first uplink time-frequency resource, a second uplink time-frequency resource usable by the terminal device. The second uplink time-frequency resource occupies K subbands in the M subbands in frequency domain, and M>K≥1. The (Continued)

first uplink channel can be sent by the terminal device by using the second uplink time-frequency resource.

20 Claims, 6 Drawing Sheets

(56) References Cited

U.S. PATENT DOCUMENTS

| | | |
|---|---|---|
| 2012/0275381 A1 | 11/2012 | Kim et al. |
| 2018/0110057 A1 | 4/2018 | Park et al. |
| 2018/0199381 A1 | 7/2018 | Rong et al. |
| 2019/0349919 A1* | 11/2019 | Oh .................... H04W 72/1268 |

FOREIGN PATENT DOCUMENTS

| | | |
|---|---|---|
| CN | 103906179 A | 7/2014 |
| CN | 106507497 A | 3/2017 |
| EP | 2524562 B1 | 1/2016 |
| EP | 3136804 A1 | 3/2017 |
| WO | 2015172098 A1 | 11/2015 |
| WO | 2016167623 A1 | 10/2016 |

\* cited by examiner

UPLINK CHANNEL TRANSMISSION METHOD AND APPARATUS, AND DOWNLINK CHANNEL TRANSMISSION METHOD AND APPARATUS

CROSS-REFERENCE TO RELATED APPLICATIONS

This application is continuation application of International Application No. PCT/CN2018/084397, filed on Apr. 25, 2018, which claims priority to Chinese Patent Application No. 201710308804.1, filed on May 4, 2017, The disclosures of the aforementioned applications are hereby incorporated by reference in their entireties.

TECHNICAL FIELD

This application relates to the communications field, and more specifically, to an uplink channel transmission method and apparatus, and a downlink channel transmission method and apparatus.

BACKGROUND

With development and popularization of communications technologies, a quantity of terminal devices greatly increases. Licensed spectrum resources that can be provided by current communications systems can no longer meet requirements. Communication congestion may be caused when a large quantity of terminal devices share a same licensed spectrum resource. Consequently, communication reliability and user experience are severely affected.

To resolve the foregoing problem, a communications technology based on a unlicensed spectrum resource appears. In the technology, a bandwidth of a system single carrier is 20 mega hertz (Mega Hertz, MHz). A network device allocates, from unlicensed spectrum resources, a frequency domain resource (for ease of understanding, denoted as a frequency domain resource #1 below) to a terminal device for wireless communication (for example, uplink transmission or downlink transmission). A maximum bandwidth of the frequency domain resource may be the same as the system bandwidth. To be specific, a bandwidth of the frequency domain resource #1 may be 20 MHz.

In addition, in the prior art, the network device or the terminal device needs to perform full bandwidth detection on a carrier on which the frequency domain resource #1 is located. If detecting that all of resources in a full bandwidth range of the frequency domain resource #1 can be used, the network device and the terminal device may perform wireless communication by using the frequency domain resource #1.

With development of the foregoing communications technology based on a unlicensed spectrum resource, a bandwidth of a single carrier of a communications system gradually increases. For example, the bandwidth of the system single carrier may reach 100 MHz. Correspondingly, a bandwidth of a unlicensed spectrum resource (for example, the frequency domain resource #1) allocated by the network device to the terminal device may also increase. To be specific, the bandwidth of the frequency domain resource #1 is greater than 20 MHz, for example, may reach 100 MHz.

In this case, based on the foregoing prior art, the network device or the terminal device needs to detect a carrier on which the frequency domain resource #1 whose bandwidth is greater than 20 MHz is located, and can perform wireless communication by using the frequency domain resource #1 only when detecting that all of the resources in the full bandwidth range of the carrier can be used. Because the bandwidth of the system single carrier is large, a probability that the network device or the terminal device obtains an entire bandwidth of the carrier through contention is low. Further, a possibility that the network device or the terminal device can perform wireless communication by using the frequency domain resource #1 is also low. Consequently, communication efficiency on a unlicensed spectrum is reduced, a service transmission latency of the terminal device is increased, and user experience of the terminal device is severely affected.

SUMMARY

This application provides an uplink channel transmission method and apparatus, and a downlink channel transmission method and apparatus, to improve communication efficiency, reduce a service transmission latency, and improve user experience.

According to a first aspect, an uplink channel transmission method is provided, where the method is applied to a communications system including a network device and a terminal device, a system frequency domain resource used by the communications system is divided into N subbands, N≥2, the system frequency domain resource is a frequency domain resource used based on a contention mechanism, and the method includes: receiving, by the terminal device, scheduling information from the network device, where the scheduling information is used to indicate uplink time-frequency resources that are used to carry at least one uplink channel and that are allocated by the network device to the terminal device, a first uplink time-frequency resource in the uplink time-frequency resources is used to carry a first uplink channel in the at least one uplink channel, and the first uplink time-frequency resource occupies M subbands in the N subbands in frequency domain, N≥M≥2; detecting, by the terminal device, the M subbands, to determine, from the first uplink time-frequency resource, a second uplink time-frequency resource that can be used by the terminal device, where the second uplink time-frequency resource occupies K subbands in the M subbands in frequency domain, M>K≥1; and sending, by the terminal device, the first uplink channel by using the second uplink time-frequency resource.

According to the uplink channel transmission method in this embodiment of the present invention, the system frequency domain resource used based on the contention mechanism is divided into a plurality of subbands; in addition, after the first uplink time-frequency resource allocated by the network device is determined, and before uplink transmission needs to be performed, the terminal device detects at least two subbands occupied by the first uplink time-frequency resource, so that the terminal device determines, from the at least two subbands, the second uplink time-frequency resource that can be used by the terminal device, and performs uplink data transmission by using the second uplink time-frequency resource. To be specific, compared with the prior art, before using the first uplink time-frequency resource to perform wireless communication, the terminal device does not need to determine that all of resources in a full bandwidth range of the first uplink time-frequency resource can be used. In this way, a possibility that the terminal device can use the first uplink time-frequency resource (specifically, some subbands in the first uplink time-frequency resource) to perform wireless communication can be increased, communication efficiency is improved, a service transmission latency is reduced, and user experience is improved.

In some embodiments, the method further includes: sending, by the terminal device, first indication information to the network device, where the first indication information is used to indicate the K subbands occupied by the second uplink time-frequency resource.

In some embodiments, the method further includes: sending, by the terminal device, first indication information to the network device, where the first indication information is used to indicate the second uplink time-frequency resource.

In some embodiments, the method further includes: sending, by the terminal device, first indication information to the network device, where the first indication information is used to indicate M−K subbands occupied by a time-frequency resource other than the second uplink time-frequency resource in the first uplink time-frequency resource.

In some embodiments, the method further includes: sending, by the terminal device, first indication information to the network device, where the first indication information is used to indicate a time-frequency domain resource other than the second uplink time-frequency resource in the first uplink time-frequency resource.

In some embodiments, the first indication information is carried on an uplink control channel.

In some embodiments, the first indication information is carried on an uplink data channel.

In some embodiments, the first indication information is carried on a reference signal.

The terminal device is enabled to send the first indication information to the network device, so that the network device can determine the second uplink time-frequency resource, and receive the uplink data on the second uplink time-frequency resource. In this way, the network device can be prevented from detecting, on a resource other than the second uplink time-frequency resource in the first uplink time-frequency domain resource, the data sent by the terminal device, so that processing load of the network device can be reduced.

In some embodiments, the second uplink time-frequency resource includes a plurality of time-frequency resource elements RE, and the sending, by the terminal device, first indication information to the network device includes: sending, by the terminal device, the first indication information to the network device by using at least one of the plurality of REs.

In some embodiments, the sending, by the terminal device, first indication information to the network device includes: determining, by the terminal device, a third uplink time-frequency resource from the second uplink time-frequency resource; and sending, by the terminal device, the first indication information by using the third uplink time-frequency resource.

In some embodiments, a size value of the third uplink time-frequency resource and/or a location of the third uplink time-frequency resource in the second uplink time domain resource are/is specified by the communications system.

In some embodiments, a size value of the third uplink time-frequency resource and/or a location of the third uplink time-frequency resource in the second uplink time domain resource are/is pre-indicated by the network device (for example, by using RRC signaling).

In some embodiments, a size value of the third uplink time-frequency resource and/or a location of the third uplink time-frequency resource in the second uplink time domain resource are/is indicated by the scheduling information.

In some embodiments, the sending, by the terminal device, the first uplink channel by using the second uplink time-frequency resource includes: determining, by the terminal device, a first uplink transport block size TBS based on a size of the first uplink time-frequency resource; and sending, by the terminal device, the first uplink channel to the network device based on the first uplink TBS by using the second uplink time-frequency resource.

In some embodiments, the first uplink channel carries information obtained after channel coding is performed based on the first TBS.

In some embodiments, the scheduling information is further used to indicate a first uplink modulation and coding scheme MCS index, and the determining, by the terminal device, a first uplink transport block size TBS based on a size of the first uplink time-frequency resource includes: determining, by the terminal device, a first uplink modulation order and the first uplink transport block size TBS based on the size of the first uplink time-frequency resource and the first uplink MCS index.

In some embodiments, the sending, by the terminal device, the first uplink channel to the network device based on the first uplink TBS by using the second uplink time-frequency resource includes: sending, by the terminal device, the uplink data to the network device based on the first uplink TBS and a second uplink modulation order by using the second uplink time-frequency domain resource.

In some embodiments, the second uplink modulation order is different from the first uplink modulation order.

In some embodiments, the method further includes: determining, by the terminal device, the second uplink modulation order based on a size of the second uplink time-frequency resource.

In some embodiments, the second uplink modulation order is specified by the communications system.

In some embodiments, the second uplink modulation order is pre-indicated by the network device (for example, by using RRC signaling).

In some embodiments, the second uplink modulation order is specified by the scheduling information.

In some embodiments, the second uplink modulation order is determined based on a second uplink MCS configuration set, where the second uplink MCS configuration set is different from a first uplink MCS configuration set, and the first uplink MCS configuration set is a configuration set for determining the first uplink modulation order.

In some embodiments, the method further includes: sending, by the terminal device, indication information of the second uplink modulation order to the network device. According to the uplink channel transmission method in this embodiment of the present invention, the terminal device is enabled to perform uplink transmission based on the TBS indicated by the network device, so that complexity of implementation of the terminal device can be reduced, and complexity of transmission can be reduced. Further, the terminal device adjusts, by using a modulation order matching an actually used time-frequency resource for uplink transmission, a bit rate actually used for uplink transmission, to improve reliability and accuracy of transmission.

In some embodiments, the sending, by the terminal device, the first uplink channel by using the second uplink time-frequency resource includes: sending, by the terminal device, the first uplink channel to the network device based on the second uplink TBS by using the second uplink time-frequency resource.

In some embodiments, the first uplink channel carries information obtained after channel coding is performed based on the second TBS.

In some embodiments, the method further includes: determining, by the terminal device, a second uplink TBS based on a size of the second uplink time-frequency resource.

In some embodiments, the scheduling information is further used to indicate a first uplink modulation and coding scheme MCS index, and the determining, by the terminal device, a second uplink transport block size TBS based on a size of the second uplink time-frequency resource includes: determining, by the terminal device, a first uplink modulation order and the second uplink transport block size TBS based on the size of the second uplink time-frequency resource and the first uplink MCS index.

In some embodiments, the second uplink TBS is different from the first uplink TBS, where the first uplink TBS is determined based on the size of the first uplink time-frequency resource and the first uplink MCS index.

In some embodiments, the second uplink TBS is specified by the communications system.

In some embodiments, the second uplink TBS is pre-indicated by the network device (for example, by using RRC signaling).

In some embodiments, the second uplink TBS is specified by the scheduling information.

In some embodiments, the method further includes: sending, by the terminal device, indication information of the second uplink TBS to the network device.

In some embodiments, the sending, by the terminal device, the first uplink channel to the network device based on the second uplink TBS by using the second uplink time-frequency resource includes: sending, by the terminal device, the uplink data to the network device based on the second uplink TBS and a second uplink modulation order by using the second uplink time-frequency domain resource, where the second uplink modulation order is different from the first uplink modulation order.

In some embodiments, the method further includes: determining, by the terminal device, the second uplink modulation order based on a size of the second uplink time-frequency resource.

In some embodiments, the second uplink modulation order is specified by the communications system.

In some embodiments, the second uplink modulation order is pre-indicated by the network device (for example, by using RRC signaling).

In some embodiments, the second uplink modulation order is specified by the scheduling information.

In some embodiments, the second uplink modulation order is determined based on a second uplink MCS configuration set, where the second uplink MCS configuration set is different from a first uplink MCS configuration set, and the first uplink MCS configuration set is a configuration set for determining the first uplink modulation order.

In some embodiments, the method further includes: sending, by the terminal device, indication information of the second uplink modulation order to the network device.

According to the uplink channel transmission method in this embodiment of the present invention, the terminal device is enabled to re-determine, based on a quantity of RBs included in an actually used resource, the TBS used for uplink transmission, so that the determined TBS corresponds to a size of the resource actually used for uplink transmission, thereby improving reliability and accuracy of uplink transmission.

In some embodiments, the receiving, by the terminal device, scheduling information from the network device includes: receiving, by the terminal device from the network device, P pieces of scheduling information for the first uplink channel, where the first uplink time-frequency resource includes a time-frequency resource indicated by each of the P pieces of scheduling information, the time-frequency resource indicated by each of the P pieces of scheduling information occupies at least one subband, and subbands occupied by time-frequency resources indicated by any two of the P pieces of scheduling information are at least partially different, $P \geq 2$; and determining, by the terminal device, the first uplink time-frequency resource based on the time-frequency resource indicated by each of the P pieces of scheduling information; and the detecting, by the terminal device, the M subbands includes: detecting, by the terminal device, a subband occupied by the time-frequency resource indicated by each of the P pieces of scheduling information, where the second uplink time-frequency resource includes a time-frequency resource indicated by Q of the P pieces of scheduling information, $1 \leq Q < P$.

In some embodiments, time-frequency domain resources indicated by the P pieces of scheduling information have a nested structure.

In some embodiments, time-frequency domain resources indicated by any two of the P pieces of scheduling information do not overlap.

In some embodiments, time-frequency domain resources indicated by any two of the P pieces of scheduling information have an overlapping part.

In some embodiments, the second uplink time-frequency resource includes a time-frequency resource indicated by first scheduling information in the P pieces of scheduling information, and the method further includes: sending, by the terminal device, an identifier of the first scheduling information to the network device.

In some embodiments, the method further includes: sending, by the terminal device, time domain indication information to the network device, where the time domain indication information is used to indicate a start moment at which the terminal device sends the first uplink channel to the network device by using the second uplink time-frequency resource.

In some embodiments, the method further includes: sending, by the terminal device, time domain indication information to the network device, where the time domain indication information is used to indicate a time period in which the terminal device sends the first uplink channel to the network device by using the second uplink time-frequency resource.

In some embodiments, the method further includes: sending, by the terminal device, time domain indication information to the network device, where time domain indication information is used to indicate a start moment of the second uplink time-frequency resource.

According to a second aspect, an uplink channel transmission method is provided, where the method is applied to a communications system including a network device and a terminal device, a system frequency domain resource used by the communications system is divided into N subbands, $N \geq 2$, the system frequency domain resource is a frequency domain resource used based on a contention mechanism, and the method includes: sending, by the network device, scheduling information to the terminal device, where the scheduling information is used to indicate uplink time-frequency resources that are used to carry at least one uplink channel and that are allocated by the network device to the terminal device, a first uplink time-frequency resource in the uplink time-frequency resources is used to carry a first uplink channel in the at least one uplink channel, and the first uplink time-frequency resource occupies M subbands in the N subbands in frequency domain, $N \geq M \geq 2$; and receiving, by the network device, the first uplink channel from the terminal device by using a second uplink time-frequency resource, where the second uplink time-frequency resource occupies K subbands in the M subbands in frequency domain, $M > K \geq 1$.

In some embodiments, the method further includes: receiving, by the network device, first indication information from the terminal device, where the first indication information is used to indicate the K subbands occupied by the second uplink time-frequency resource; and determining, by the network device, the second uplink time-frequency resource based on the first indication information.

In some embodiments, the method further includes: receiving, by the network device, first indication information from the terminal device, where the first indication information is used to indicate a second uplink time-frequency resource; and determining, by the network device, the second uplink time-frequency resource based on the first indication information.

In some embodiments, the method further includes: receiving, by the network device, first indication information from the terminal device, where the first indication information is used to indicate M−K subbands occupied by a time-frequency resource other than the second uplink time-frequency resource in the first uplink time-frequency resource; and determining, by the network device, the second uplink time-frequency resource based on the first indication information.

In some embodiments, the method further includes: receiving, by the network device, first indication information from the terminal device, where the first indication information is used to indicate a time-frequency resource other than the second uplink time-frequency resource in the first uplink time-frequency resource; and determining, by the network device, the second uplink time-frequency resource based on the first indication information.

The terminal device is enabled to send the first indication information to the network device, so that the network device can determine the second uplink time-frequency resource, and receive the uplink data on the second uplink time-frequency resource. In this way, the network device can be prevented from detecting, on a resource other than the second uplink time-frequency resource in the first uplink time-frequency domain resource, the data sent by the terminal device, so that processing load of the network device can be reduced.

In some embodiments, the second uplink time-frequency resource includes a plurality of time-frequency resource elements RE, and the receiving, by the network device, first indication information from the terminal device includes: receiving, by the network device, the first indication information from the terminal device by using at least one of the plurality of REs.

In some embodiments, the receiving, by the network device, first indication information from the terminal device includes: determining, by the network device, a third uplink time-frequency resource from the second uplink time-frequency resource; and receiving, by the network device, the first indication information from the terminal device by using the third uplink time-frequency resource.

In some embodiments, a size value of the third uplink time-frequency resource and/or a location of the third uplink time-frequency resource in the second uplink time domain resource are/is specified by the communications system.

In some embodiments, a size value of the third uplink time-frequency resource and/or a location of the third uplink time-frequency resource in the second uplink time domain resource are/is pre-indicated by the network device (for example, by using RRC signaling).

In some embodiments, a size value of the third uplink time-frequency resource and/or a location of the third uplink time-frequency resource in the second uplink time domain resource are/is indicated by the scheduling information.

In some embodiments, the method further includes: determining, by the network device, the second uplink time-frequency resource based on whether each of the M subbands carries a reference signal.

In some embodiments, the receiving, by the network device, the first uplink channel from the terminal device by using a second uplink time-frequency resource includes: determining, by the network device, a first uplink transport block size TBS based on a size of the first uplink time-frequency resource; and receiving, by the network device, the first uplink channel from the terminal device based on the first uplink TBS by using the second uplink time-frequency resource.

In some embodiments, the first indication information is carried on an uplink control channel.

In some embodiments, the first indication information is carried on an uplink data channel.

In some embodiments, the first indication information is carried on a reference signal.

In some embodiments, the scheduling information is further used to indicate a first uplink modulation and coding scheme MCS index, and the determining, by the terminal device, a first uplink transport block size TBS based on a size of the first uplink time-frequency resource includes: determining, by the terminal device, a first uplink modulation order and the first uplink transport block size TBS based on the size of the first uplink time-frequency resource and the first uplink MCS index.

In some embodiments, the first uplink channel carries information obtained after channel coding is performed on a TB of the first uplink TBS.

In some embodiments, the receiving, by the network device, the first uplink channel from the terminal device based on the first uplink TBS by using the second uplink time-frequency resource includes: receiving, by the network device, the first uplink channel from the terminal device based on the first uplink TBS and a second uplink modulation order by using the second uplink time-frequency domain resource.

In some embodiments, the second uplink modulation order is different from the first uplink modulation order.

In some embodiments, the method further includes: determining, by the network device, the second uplink modulation order based on a size of the second uplink time-frequency resource.

In some embodiments, the second uplink modulation order is specified by the communications system.

In some embodiments, the second uplink modulation order is pre-indicated by the network device (for example, by using RRC signaling).

In some embodiments, the second uplink modulation order is specified by the scheduling information.

In some embodiments, the second uplink modulation order is determined based on a second uplink MCS configuration set, where the second uplink MCS configuration set is different from a first uplink MCS configuration set, and the first uplink MCS configuration set is a configuration set for determining the first uplink modulation order.

In some embodiments, the method further includes: receiving, by the network device, indication information of the second uplink modulation order from the terminal device.

According to the uplink channel transmission method in this embodiment of the present invention, the terminal device is enabled to perform uplink transmission based on the TBS indicated by the network device, so that complexity of implementation of the terminal device can be reduced, and complexity of transmission can be reduced. Further, the terminal device adjusts, by using a modulation order matching an actually used time-frequency resource for uplink transmission, a bit rate actually used for uplink transmission, to improve reliability and accuracy of transmission.

In some embodiments, the receiving, by the network device, the first uplink channel from the terminal device by using a second uplink time-frequency resource includes: receiving, by the network device, the first uplink channel from the terminal device based on the second uplink TBS by using the second uplink time-frequency resource.

In some embodiments, the first uplink channel carries information obtained after channel coding is performed on a TB of the second uplink TBS.

In some embodiments, the method further includes: determining, by the network device, a second uplink TBS based on a size of the second uplink time-frequency resource.

In some embodiments, the scheduling information is further used to indicate a first uplink modulation and coding scheme MCS index, and the determining, by the network device, a second uplink transport block size TBS based on a size of the second uplink time-frequency resource includes: determining, by the network device, a first uplink modulation order and the second uplink transport block size TBS based on the size of the second uplink time-frequency resource and the first uplink MCS index.

In some embodiments, the second uplink TBS is different from the first uplink TBS, where the first uplink TBS is determined based on the size of the first uplink time-frequency resource and the first uplink MCS index.

In some embodiments, the second uplink TBS is specified by the communications system.

In some embodiments, the second uplink TBS is pre-indicated by the network device (for example, by using RRC signaling).

In some embodiments, the second uplink TBS is specified by the scheduling information.

In some embodiments, the method further includes: receiving, by the network device, indication information of the second uplink TBS from the terminal device.

In some embodiments, the receiving, by the network device, the first uplink channel from the terminal device based on the second uplink TBS by using the second uplink time-frequency resource includes: receiving, by the network device, the uplink data from the terminal device based on the second uplink TBS and a second uplink modulation order by using the second uplink time-frequency domain resource, where the second uplink modulation order is different from the first uplink modulation order.

In some embodiments, the method further includes: determining, by the network device, the second uplink modulation order based on a size of the second uplink time-frequency resource.

In some embodiments, the second uplink modulation order is specified by the communications system.

In some embodiments, the second uplink modulation order is pre-indicated by the network device (for example, by using RRC signaling).

In some embodiments, the second uplink modulation order is specified by the scheduling information.

In some embodiments, the second uplink modulation order is determined based on a second uplink MCS configuration set, where the second uplink MCS configuration set is different from a first uplink MCS configuration set, and the first uplink MCS configuration set is a configuration set for determining the first uplink modulation order.

In some embodiments, the method further includes: receiving, by the network device, indication information of the second uplink modulation order from the terminal device.

According to the uplink channel transmission method in this embodiment of the present invention, the terminal device is enabled to re-determine, based on a quantity of RBs included in an actually used resource, the TBS used for uplink transmission, so that the determined TBS corresponds to a size of the resource actually used for uplink transmission, thereby improving reliability and accuracy of uplink transmission.

In some embodiments, the sending, by the network device, scheduling information to the terminal device includes: sending, by the network device to the terminal device, P pieces of scheduling information for the first uplink channel, where the first uplink time-frequency resource includes a time-frequency resource indicated by each of the P pieces of scheduling information, the time-frequency resource indicated by each of the P pieces of scheduling information occupies at least one subband, and subbands occupied by time-frequency resources indicated by any two of the P pieces of scheduling information are at least partially different, P≥2, and the second uplink time-frequency resource includes a time-frequency resource indicated by Q of the P pieces of scheduling information, 1≤Q<P.

In some embodiments, the second uplink time-frequency resource includes a time-frequency resource indicated by first scheduling information in the P pieces of scheduling information, and the method further includes: receiving, by the network device, an identifier of the first scheduling information sent by the terminal device; and determining, by the network device, the second uplink time-frequency resource based on the identifier of the first scheduling information.

In some embodiments, time-frequency domain resources indicated by the P pieces of scheduling information have a nested structure.

In some embodiments, time-frequency domain resources indicated by any two of the P pieces of scheduling information do not overlap.

In some embodiments, time-frequency domain resources indicated by any two of the P pieces of scheduling information overlap.

In some embodiments, the method further includes: receiving, by the network device, time domain indication information from the terminal device, where the time domain indication information is used to indicate a start moment at which the terminal device sends the uplink channel to the network device by using the second uplink time-frequency resource, or the time domain indication information is used to indicate a time period in which the terminal device sends the uplink channel to the network device by using the second uplink time-frequency resource.

According to a third aspect, a downlink channel transmission method is provided, where the method is applied to a communications system including a network device and a terminal device, a system frequency domain resource used by the communications system is divided into N subbands, N≥2, the system frequency domain resource is a frequency domain resource used based on a contention mechanism, and the method includes: allocating, by the network device to the terminal device, downlink time-frequency resources used to carry at least one downlink channel, where a first downlink time-frequency resource in the downlink time-frequency resources is used to carry a first downlink channel in the at least one downlink channel, and the first downlink time-frequency resource occupies M subbands in the N subbands in frequency domain, N≥M≥2; detecting, by the network device, the M subbands, to determine, from the first downlink time-frequency resource, a second downlink time-frequency resource that can be used by the network device, where the second downlink time-frequency resource occupies K subbands in the M subbands in frequency domain, M>K≥1; and sending, by the network device, the first downlink channel by using the second downlink time-frequency resource.

According to the downlink channel transmission method in this embodiment of the present invention, the system frequency domain resource used based on the contention mechanism is divided into a plurality of subbands; in addition, after the network device allocates the first downlink frequency domain resource to the terminal device, and before downlink transmission needs to be performed, the network device detects at least two subbands occupied by the first downlink frequency domain resource, so that the network device determines, from the at least two subbands, the second downlink frequency domain resource that can be used by the network device, and performs downlink data transmission by using the second downlink frequency domain resource. To be specific, compared with the prior art, before using the first downlink frequency domain resource to perform wireless communication, the network device does not need to determine that all of resources in a full bandwidth range of the first downlink frequency domain resource can be used. In this way, a possibility that the network device can use the first downlink frequency domain resource (specifically, some subbands in the first downlink frequency domain resource) to perform wireless communication can be increased, communication efficiency is improved, a service transmission latency is reduced, and user experience is improved.

In some embodiments, the method further includes: sending, by the network device, first control information to the terminal device, where the first control information is used to indicate the first downlink time-frequency resource.

In some embodiments, the sending, by the network device, first control information to the terminal device includes: sending, by the network device, the first control information to the terminal device on at least one of the K subbands.

In some embodiments, the sending, by the network device, first control information to the terminal device includes: sending, by the network device, the first control information to the terminal device on at least one of the K subbands.

In some embodiments, the method further includes: sending, by the network device, second control information to the terminal device, where the second control information is used to indicate the K subbands occupied by the second downlink time-frequency resource.

In some embodiments, the method further includes: sending, by the network device, second control information to the terminal device, where the second control information is used to indicate a valid subband that is in N subbands included in the system and that is determined by the network device, so that the terminal device determines the second downlink time-frequency resource based on the valid subband in the N subbands and the first downlink time-frequency resource. In some embodiments, the method further includes: sending, by the network device, second control information to the terminal device, where the second control information is used to indicate the second downlink time-frequency resource.

In some embodiments, the method further includes: sending, by the network device, second control information to the terminal device, where the second control information is used to indicate M−K subbands occupied by a time-frequency resource other than the second downlink time-frequency resource in the first downlink time-frequency resource.

In some embodiments, the method further includes: sending, by the network device, second control information to the terminal device, where the second control information is used to indicate a time-frequency resource other than the second downlink time-frequency resource in the first downlink time-frequency resource.

In some embodiments, the second control information is used to indicate the K subbands occupied by the second downlink time-frequency resource on a first transmission time interval TTI, and the second downlink time-frequency resource belongs to the first TTI in time domain.

In some embodiments, the second control information is used to indicate the K subbands occupied by the second downlink time-frequency resource on a first transmission opportunity TxOP, and the second downlink time-frequency resource belongs to the first TxOP in time domain.

In some embodiments, the second control information is used to indicate a start location of the second downlink time-frequency resource in time domain.

In some embodiments, the second downlink time-frequency resource belongs to the first TTI in time domain, where the TTI includes at least two time domain startpoints, and a start location of the second downlink time-frequency resource in time domain is any startpoint in the at least two time domain startpoints.

In some embodiments, the sending, by the network device, second control information to the terminal device includes: sending, by the network device, the second control information to the terminal device on at least one of the K subbands.

In some embodiments, the sending, by the network device, second control information to the terminal device includes: determining, by the network device, a third downlink time-frequency resource from at least one of the K subbands; and sending, by the network device, the second control information to the terminal device by using the third downlink time-frequency resource.

In some embodiments, a size value of the third downlink time-frequency resource and/or a location of the third downlink time-frequency resource in the at least one of the K subbands are/is specified by the communications system.

In some embodiments, a size value of the third downlink time-frequency resource and/or a location of the third downlink time-frequency resource in the at least one of the K subbands are/is pre-indicated by the network device.

In some embodiments, a size value of the third downlink time-frequency resource and/or a location of the third downlink time-frequency resource in the at least one of the K subbands are/is indicated by the first control information sent by the network device, and the first control information is used to indicate the first downlink time-frequency resource.

In some embodiments, the second control information is carried on a downlink control channel.

In some embodiments, the second control information is carried on a downlink data channel.

In some embodiments, the second control information is carried on a reference signal.

In some embodiments, the third downlink time-frequency resource is located, in time domain, on a first subframe of a maximum channel occupation time MCOT to which the third downlink time-frequency resource belongs.

In some embodiments, the third downlink time-frequency resource is located, in time domain, on each subframe of an MCOT to which the third downlink time-frequency resource belongs.

The network device is enabled to send, to the terminal device, the downlink resource indication information used to indicate the second downlink time-frequency resource, so that the terminal device determines the second downlink time-frequency resource, and receives the downlink data on the second downlink time-frequency resource. In this way, the terminal device can be prevented from detecting, on a resource other than the second downlink time-frequency resource in the first downlink time-frequency resource, the data sent by the network device, so that processing load of the terminal device can be reduced.

In some embodiments, the second downlink time-frequency resource includes a plurality of time-frequency resource elements RE, and the sending, by the network device, second control information to the terminal device includes: sending, by the network device, the second control information to the terminal device by using at least one of the plurality of REs.

In some embodiments, the sending, by the network device, the first downlink channel by using the second downlink time-frequency resource includes: determining, by the network device, a first downlink transport block size TBS based on a size of the first downlink frequency domain resource; and sending, by the network device, the first downlink channel to the terminal device based on the first downlink TBS by using the second downlink frequency domain resource.

In some embodiments, the determining, by the network device, a first downlink transport block size TBS based on a size of the first downlink time-frequency resource includes: determining, by the network device, a first downlink modulation order and the first downlink transport block size TBS based on the size of the first downlink time-frequency resource.

In some embodiments, the sending, by the network device, the first downlink channel to the terminal device based on the first downlink TBS by using the second downlink frequency domain resource includes: sending, by the network device, the first downlink channel to the terminal device based on the first downlink TBS and a second downlink modulation order by using the second downlink frequency domain resource.

In some embodiments, the first downlink channel carries information obtained after channel coding is performed on a TB of the first downlink TBS.

In some embodiments, the second downlink modulation order is different from the first downlink modulation order.

In some embodiments, the method further includes: determining, by the network device, the second downlink modulation order based on a size of the second downlink frequency domain resource.

In some embodiments, the second downlink modulation order is specified by the communications system.

In some embodiments, the second downlink modulation order is pre-indicated by the network device (for example, by using RRC signaling).

In some embodiments, the second downlink modulation order is indicated by the first control information, where the first control information is used to indicate the first downlink time-frequency resource.

In some embodiments, the second downlink modulation order is determined based on a second downlink MCS configuration set, where the second downlink MCS configuration set is different from a first downlink MCS configuration set, and the first downlink MCS configuration set is a configuration set for determining the first downlink modulation order.

In some embodiments, the second downlink modulation order is indicated by the second control information, where the second control information is used to indicate the second downlink time-frequency resource.

In some embodiments, the method further includes: sending, by the network device, indication information of the second downlink modulation order to the terminal device.

According to the data transmission method in this embodiment of the present invention, the TBS allocated by the network device to the terminal device by using a scheduled time-frequency resource is transmitted on a time-frequency resource that can be actually used, and a scheduling policy of the network device does not need to be changed, so that implementation complexity of the network device can be reduced. Further, the network device adjusts, by using a modulation order matching an actually used time-frequency resource for downlink transmission, a bit rate actually used for downlink transmission, to improve reliability and accuracy of transmission.

In some embodiments, the sending, by the network device, the first downlink channel by using the second downlink time-frequency resource includes: sending, by the network device, the first downlink channel to the terminal device based on the second downlink TBS by using the second downlink time-frequency resource.

In some embodiments, the method further includes: determining, by the network device, a second downlink TBS based on a size of the second downlink time-frequency resource.

In some embodiments, the determining, by the network device, a second downlink TBS based on a size of the second downlink time-frequency resource includes: determining, by the network device, the first downlink modulation order and the second TBS based on the size of the second downlink time-frequency resource.

In some embodiments, the first downlink channel carries information obtained after channel coding is performed on a TB of the second downlink TBS.

In some embodiments, the sending, by the network device, the first downlink channel to the terminal device based on the second downlink TBS by using the second downlink frequency domain resource includes: sending, by the network device, the first downlink channel to the terminal device based on the second downlink TBS and a first downlink modulation order by using the second downlink frequency domain resource.

In some embodiments, the sending, by the network device, the first downlink channel to the terminal device based on the second downlink TBS by using the second downlink frequency domain resource includes: sending, by the network device, the first downlink channel to the terminal device based on the second downlink TBS and a second downlink modulation order by using the second downlink frequency domain resource.

In some embodiments, the second downlink modulation order is different from the first downlink modulation order.

In some embodiments, the method further includes: determining, by the network device, the second downlink modulation order based on a size of the second downlink frequency domain resource.

In some embodiments, the second downlink modulation order is specified by the communications system.

In some embodiments, the second downlink modulation order is pre-indicated by the network device (for example, by using RRC signaling).

In some embodiments, the second downlink modulation order is indicated by the first control information, where the first control information is used to indicate the first downlink time-frequency resource.

In some embodiments, the second downlink modulation order is determined based on a second downlink MCS configuration set, where the second downlink MCS configuration set is different from a first downlink MCS configuration set, and the first downlink MCS configuration set is a configuration set for determining the first downlink modulation order.

In some embodiments, the second downlink modulation order is indicated by the second control information, where the second control information is used to indicate the second downlink time-frequency resource.

In some embodiments, the method further includes: sending, by the network device, indication information of the second downlink modulation order to the terminal device.

According to a fourth aspect, a downlink channel transmission method is provided, where the method is applied to a communications system including a network device and a terminal device, a system frequency domain resource used by the communications system is divided into N subbands, N≥2, the system frequency domain resource is a frequency domain resource used based on a contention mechanism, and the method includes: determining, by the terminal device, downlink time-frequency resources that are used to carry at least one downlink channel and that are allocated by the network device, where a first downlink time-frequency resource in the downlink time-frequency resources is used to carry a first downlink channel in the at least one downlink channel, and the first downlink time-frequency resource occupies M subbands in the N subbands in frequency domain, N≥M≥2; and receiving, by the terminal device, the first downlink channel from the network device by using a second downlink time-frequency resource, where the second downlink time-frequency resource occupies K subbands in the M subbands in frequency domain, M>K≥1.

In some embodiments, the determining, by the terminal device, time-frequency resources that are used to carry at least one downlink channel and that are allocated by the network device includes: receiving, by the terminal device, first control information from the network device, where the first control information is used to indicate the first downlink time-frequency resource; and determining, by the terminal device, the first downlink time-frequency resource based on the first control information.

In some embodiments, the first control information is carried on at least one of the K subbands.

In some embodiments, the first control information is carried on each of the K subbands.

In some embodiments, the method further includes: receiving, by the terminal device, second control information from the network device, where the second control information is used to indicate the K subbands occupied by the second downlink time-frequency resource; and determining, by the terminal device, the second downlink time-frequency resource based on the second control information.

In some embodiments, the method further includes: receiving, by the terminal device, second control information from the network device, where the second control information is used to indicate a valid subband that is in N subbands included in the system and that is determined by the network device; and determining, by the terminal device, the second downlink time-frequency resource based on the second control information and the first downlink time-frequency resource.

In some embodiments, the receiving, by the terminal device, second control information from the network device includes: determining, by the terminal device, a third downlink time-frequency resource from at least one of the K subbands; and receiving, by the terminal device, the second control information from the network device by using the third downlink time-frequency resource.

In some embodiments, a size value of the third downlink time-frequency resource and/or a location of the third downlink time-frequency resource in the at least one of the K subbands are/is specified by the communications system.

In some embodiments, a size value of the third downlink time-frequency resource and/or a location of the third downlink time-frequency resource in the at least one of the K subbands are/is pre-indicated by the network device.

In some embodiments, a size value of the third downlink time-frequency resource and/or a location of the third downlink time-frequency resource in the at least one of the K subbands are/is indicated by the first control information sent by the network device, and the first control information is used to indicate the first downlink time-frequency resource.

In some embodiments, the second control information is carried on a downlink control channel.

In some embodiments, the second control information is carried on a downlink data channel.

In some embodiments, the second control information is carried on a reference signal.

In some embodiments, the third downlink time-frequency resource is located, in time domain, on a first subframe of a maximum channel occupation time MCOT to which the third downlink time-frequency resource belongs.

In some embodiments, the third downlink time-frequency resource is located, in time domain, on each subframe of an MCOT to which the third downlink time-frequency resource belongs.

The network device is enabled to send, to the terminal device, the downlink resource indication information used to indicate the second downlink time-frequency resource, so that the terminal device determines the second downlink time-frequency resource, and receives the downlink data on the second downlink time-frequency resource. In this way, the terminal device can be prevented from detecting, on a resource other than the second downlink time-frequency resource in the first downlink time-frequency resource, the data sent by the network device, so that processing load of the terminal device can be reduced.

In some embodiments, the second downlink frequency domain resource includes a plurality of time-frequency resource elements RE, and the receiving, by the terminal device, second control information from the network device includes: receiving, by the terminal device, the second control information from the network device by using at least one of the plurality of REs.

In some embodiments, the method further includes: determining, by the terminal device, the second downlink time domain resource based on whether each of the M subbands carries a reference signal.

In some embodiments, the receiving, by the terminal device, the first downlink channel from the network device by using a second downlink time-frequency resource includes: determining, by the terminal device, a first downlink transport block size TBS based on a size of the first downlink frequency domain resource; and receiving, by the terminal device, the first downlink channel from the network device based on the first downlink TBS by using the second downlink frequency domain resource.

In some embodiments, the determining, by the terminal device, a first downlink transport block size TBS based on a size of the first downlink frequency domain resource includes: determining, by the terminal device, a first downlink modulation order and the first downlink transport block size TBS based on the size of the first downlink time-frequency resource.

In some embodiments, the receiving, by the terminal device, the first downlink channel from the network device based on the first downlink TBS by using the second downlink frequency domain resource includes: receiving, by the terminal device, the first downlink channel from the network device based on the first downlink TBS and a second downlink modulation order by using the second downlink frequency domain resource.

In some embodiments, the second downlink modulation order is different from the first downlink modulation order.

In some embodiments, the method further includes: determining, by the terminal device, the second downlink modulation order based on a size of the second downlink frequency domain resource.

In some embodiments, the second downlink modulation order is specified by the communications system.

In some embodiments, the second downlink modulation order is pre-indicated by the network device (for example, by using RRC signaling).

In some embodiments, the second downlink modulation order is indicated by the first control information, where the first control information is used to indicate the first downlink time-frequency resource.

In some embodiments, the second downlink modulation order is determined based on a second downlink MCS configuration set, where the second downlink MCS configuration set is different from a first downlink MCS configuration set, and the first downlink MCS configuration set is a configuration set for determining the first downlink modulation order.

In some embodiments, the second downlink modulation order is indicated by the second control information, where the second control information is used to indicate the second downlink time-frequency resource.

In some embodiments, the method further includes: receiving, by the terminal device, indication information of the second downlink modulation order from the network device.

According to the data transmission method in this embodiment of the present invention, the TBS allocated by the network device to the terminal device by using a scheduled time-frequency resource is transmitted on a time-frequency resource that can be actually used, and a scheduling policy of the network device does not need to be changed, so that implementation complexity of the network device can be reduced. Further, the network device adjusts, by using a modulation order matching an actually used time-frequency resource for downlink transmission, a bit rate actually used for downlink transmission, to improve reliability and accuracy of transmission.

In some embodiments, the receiving, by the terminal device, the first downlink channel by using the second downlink time-frequency resource includes: receiving, by the terminal device, the first downlink channel based on the second downlink TBS by using the second downlink time-frequency resource.

In some embodiments, the method further includes: determining, by the terminal device, a second downlink TBS based on a size of the second downlink time-frequency resource.

In some embodiments, the determining, by the terminal device, a second downlink TBS based on a size of the second downlink time-frequency resource includes: determining, by the terminal device, the first downlink modulation order and the second TBS based on the size of the second downlink time-frequency resource.

In some embodiments, the receiving, by the terminal device, the first downlink channel based on the second downlink TBS by using the second downlink frequency domain resource includes: receiving, by the terminal device, the first downlink channel based on the second downlink TBS and a first downlink modulation order by using the second downlink frequency domain resource.

In some embodiments, the receiving, by the terminal device, the first downlink channel based on the second downlink TBS by using the second downlink frequency domain resource includes: receiving, by the terminal device, the first downlink channel based on the second downlink TBS and a second downlink modulation order by using the second downlink frequency domain resource.

In some embodiments, the second downlink modulation order is different from the first downlink modulation order.

In some embodiments, the method further includes: determining, by the terminal device, the second downlink modulation order based on a size of the second downlink frequency domain resource.

In some embodiments, the second downlink modulation order is specified by the communications system.

In some embodiments, the second downlink modulation order is pre-indicated by the network device (for example, by using RRC signaling).

In some embodiments, the second downlink modulation order is indicated by the first control information, where the first control information is used to indicate the first downlink time-frequency resource.

In some embodiments, the second downlink modulation order is determined based on a second downlink MCS configuration set, where the second downlink MCS configuration set is different from a first downlink MCS configuration set, and the first downlink MCS configuration set is a configuration set for determining the first downlink modulation order.

In some embodiments, the second downlink modulation order is indicated by the second control information, where the second control information is used to indicate the second downlink time-frequency resource.

In some embodiments, the method further includes: receiving, by the terminal device, indication information of the second downlink modulation order from the network device.

According to a fifth aspect, a data channel transmission method is provided. The method includes: generating, by a sending device, an encoded data packet, where the data packet belongs to a data channel, the data channel is carried on a candidate time-frequency resource in a first time transmission interval TTI, the candidate time-frequency resource occupies, in frequency domain, M subbands in N subbands included in a system frequency domain resource, $N \geq M \geq 1$, the candidate time-frequency resource is a first time-frequency resource or a second time-frequency resource, and a second time domain startpoint of the second time-frequency resource is later than a first time domain startpoint of the first time-frequency resource; and detecting, by the sending device, a carrier on which the candidate time-frequency resource is located, and sending, by the sending device, the data channel to a receiving device on the candidate time-frequency resource based on a result of the detection, where the data channel includes the encoded uplink data packet.

In some embodiments, the first time-frequency resource and the second time-frequency resource are time-frequency resources used based on a contention mechanism.

According to the data channel transmission method in this embodiment of the present invention, a plurality of time domain startpoints are set in a TTI used based on a contention mechanism; in addition, before needing to perform uplink transmission, the sending device detects the carrier corresponding to the candidate time-frequency resource, so that the sending device determines the first time-frequency resource or the second time-frequency resource as the candidate time-frequency resource that can be used by the sending device, and transmits an uplink channel by using the candidate time-frequency resource. To be specific, compared with the prior art, before using the candidate time-frequency resource to perform wireless communication, the sending device does not need to determine that a time domain startpoint of the candidate time-frequency resource is located at a startpoint of a subframe. In this way, reliability of performing wireless communication based on the candidate time-frequency resource can be improved, so that communication efficiency is improved, a service transmission latency is reduced, and user experience is improved.

In some embodiments, the sending, by the sending device, the uplink channel on the candidate time-frequency resource based on a result of the detection includes: sending, by the sending device, the uplink channel on the first time-frequency resource when determining, before the first time domain startpoint, that the carrier on which the candidate time-frequency resource is located is in a status of being capable of being sent.

In some embodiments, the sending the uplink channel on the candidate time-frequency resource based on a result of the detection includes: sending, by the terminal device, the uplink channel on the second time-frequency resource when the sending device determines, before the first time domain startpoint, that the carrier on which the candidate time-frequency resource is located is not in a status of being capable of being sent, and when the sending device determines, before the second time domain startpoint, that the carrier on which the candidate time-frequency resource is located is in the status of being capable of being sent.

In some embodiments, a resource occupied by the second time-frequency resource in time domain is a subset of a resource occupied by the first time-frequency resource in time domain, and a size of a resource occupied by the first time-frequency resource in frequency domain is the same as a size of a resource occupied by the second time-frequency resource in frequency domain.

In some embodiments, the sending device is a network device, the receiving device is a terminal device, and the data channel is a downlink data channel.

In some embodiments, the sending device is a terminal device, the receiving device is a network device, and the data channel is an uplink data channel.

According to a sixth aspect, a data channel transmission method is provided, and is applied to a communications system including a sending device and a receiving device. A frequency domain resource used by the communications system is a frequency domain resource used based on a contention mechanism, and a transmission time interval TTI used by the communications system includes at least two time domain startpoints. The method includes: determining, by the sending device, frequency domain resources used to carry at least one data channel, where a first frequency domain resource in the frequency domain resources is used to carry a first data channel in the at least one data channel, and the first data channel is carried on a first TTI; detecting, by the sending device, the first frequency domain resource, and determining, from at least two time domain startpoints included in the first TTI, a first time domain startpoint based on a result of the detection, where after the first time domain startpoint, a second frequency domain resource in the first frequency domain resource is in a status of being capable of being sent by the sending device, and the second frequency domain resource is a part or all of the first frequency domain resource; and sending, by the sending device, the data channel to the receiving device by using the second frequency domain resource from the first time domain startpoint.

According to the data channel transmission method in this embodiment of the present invention, a plurality of time domain startpoints are set in a TTI used based on a contention mechanism; in addition, before needing to perform data channel transmission, the sending device detects the first frequency domain resource used to carry the data channel, so that the sending device determines, from the first frequency domain resource, the second frequency domain resource that can be used by the terminal device, and the sending device determines, from the at least two time domain startpoints included in the first TTI, the first time domain startpoint of the second frequency domain resource that can be used by the sending device, so that the sending device can transmit the data channel by using the second frequency domain resource from the first time domain startpoint. To be specific, compared with the prior art, before using the candidate time-frequency resource to perform wireless communication, the sending device does not need to determine that a time domain startpoint of the candidate time-frequency resource is located at a startpoint of a subframe. In this way, reliability of wireless communication based on the candidate time-frequency resource can be improved, so that communication efficiency is improved, a service transmission latency is reduced, and user experience is improved.

In some embodiments, the method further includes: sending, by the sending device, indication information of the first time domain startpoint to the receiving device.

In some embodiments, the frequency domain resource used by the communications system is divided into N subbands, $N \geq 2$, the first frequency domain resource occupies M subbands in the N subbands, $M \geq 2$, and the second frequency domain resource occupies K subbands in the M subbands in frequency domain, M>K≥1.

In some embodiments, the sending device is a network device, the receiving device is a terminal device, and the data channel is a downlink data channel.

In some embodiments, the sending device is a terminal device, the receiving device is a network device, and the data channel is an uplink data channel.

According to a seventh aspect, a data channel transmission method is provided, and is applied to a communications system including a sending device and a receiving device. A time-frequency resource used by the communications system is a time-frequency resource used based on a contention mechanism, and each TTI in a plurality of transmission time intervals TTI used by the communications system includes at least two time domain startpoints. The method includes: determining, by the sending device, time-frequency resources used to carry at least one data channel, where a candidate time-frequency resource in the time-frequency resources is used to carry a first data channel in the at least one data channel, the candidate time-frequency resource corresponds to a first TTI in time domain, the candidate time-frequency resource includes at least two time-frequency resources, and the at least two time-frequency resources have one-to-one correspondence to at least two time domain startpoints included in the first TTI; detecting, by the sending device, the candidate time-frequency resource, and determining, from the at least two time-frequency resources included in the candidate time-frequency resource, a target time-frequency resource based on a result of the detection, where the target time-frequency resource is a time-frequency resource that can be used by the terminal device; and sending, by the terminal device, the first uplink channel by using the target time-frequency resource.

According to the data channel transmission method in this embodiment of the present invention, a plurality of time domain startpoints are set in a TTI used based on a contention mechanism; in addition, before needing to perform data channel transmission, the sending device detects the candidate time-frequency resource, so that the sending device determines, from the at least two time-frequency resources with different startpoints included in the candidate time-frequency, the target time-frequency resource that can be used by the sending device, and transmits a data channel by using the target time-frequency resource. To be specific, compared with the prior art, before using the candidate time-frequency resource to perform wireless communication, the sending device does not need to determine that a time domain startpoint of the candidate time-frequency resource is located at a startpoint of a subframe. In this way, reliability of wireless communication based on the candidate time-frequency resource can be improved, so that communication efficiency is improved, a service transmission latency is reduced, and user experience is improved.

In some embodiments, the method further includes: sending, by the sending device, indication information of the target time-frequency resource to the receiving device.

In some embodiments, the method further includes: sending, by the sending device, indication information of a time domain startpoint corresponding to the target time-frequency resource to the receiving device.

In some embodiments, the at least two time-frequency resources included in the candidate time-frequency resource have a nested structure in time domain.

In some embodiments, the frequency domain resource used by the communications system is divided into N subbands, N≥2, the candidate time-frequency resource occupies M subbands in the N subbands, M≥2, and target time-frequency resource occupies K subbands in the M subbands in frequency domain, M>K≥1.

According to an eighth aspect, a data channel transmission apparatus is provided, including units configured to perform steps in any one of the foregoing first aspect to seventh aspect and implementations thereof.

According to a ninth aspect, a data channel transmission device is provided, including a memory and a processor. The memory is configured to store a computer program, and the processor is configured to: invoke the computer program from the memory and run the computer program, so that the data transmission device performs the method in any one of the foregoing first aspect to seventh aspect and implementations thereof.

According to a tenth aspect, a computer program product is provided. The computer program product includes: computer program code, where when the computer program code is run by a communications unit, a processing unit, a transceiver, or a processor in a communications device (for example, a network device or a terminal device), the communications device is enabled to perform the method in any one of the foregoing first aspect to seventh aspect and implementations thereof.

According to an eleventh aspect, a computer-readable storage medium is provided. The computer-readable storage medium stores a program, and the program enables a communications device (for example, a network device or a terminal device) to perform the method in any one of the foregoing first aspect to seventh aspect and implementations thereof.

With respect to the foregoing aspects and the foregoing implementations thereof, in another implementation, each subband includes a plurality of subcarriers.

With respect to the foregoing aspects and the foregoing implementations thereof, in another implementation, a bandwidth of each subband is determined based on a bandwidth that can be detected by a network device or a terminal device in one detection (or contention) process.

With respect to the foregoing aspects and the foregoing implementations thereof, in another implementation, a bandwidth of each subband is less than or equal to a bandwidth that can be detected by a network device or a terminal device in one detection (or contention) process.

With respect to the foregoing aspects and the foregoing implementations thereof, in another implementation, a bandwidth of each subband is 20 MHz.

DESCRIPTION OF EMBODIMENTS

Figure 1:
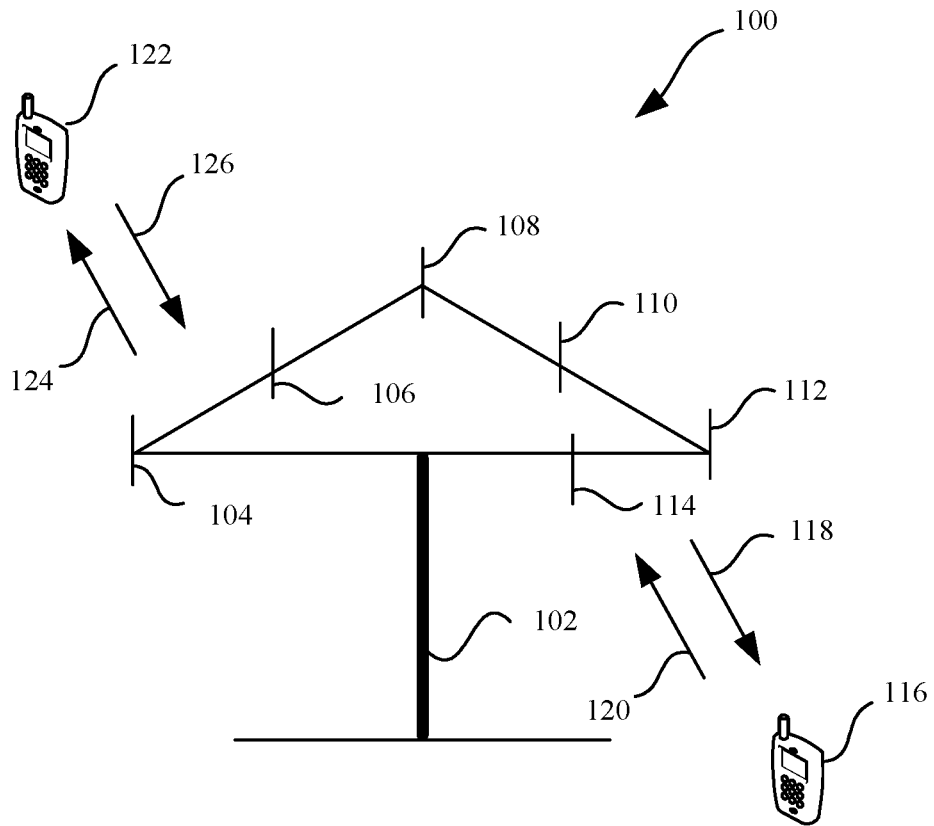
FIG. 1 is a schematic diagram of an example of a communications system to which a channel (uplink channel or downlink channel) transmission method and apparatus of embodiments of the present invention are applicable.

The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that embodiments of the present invention may be applied to various communications system, for example, a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an advanced long term evolution (Advanced long term evolution, LTE-A) system, a universal mobile telecommunication system (Universal Mobile Telecommunication System, UMTS), a wireless local area network (Wireless Local Area Networks, WLAN) system, a wireless fidelity (Wireless Fidelity, WiFi) system, or a next-generation communications system.

Usually, a connection quantity supported by a conventional communications system is limited, and is easy to implement. However, with development of communications technologies, a mobile communications system not only supports conventional communication, but also supports, for example, device-to-device (Device to Device, D2D) communication, machine-to-machine (Machine to Machine, M2M) communication, machine type communication (Machine Type Communication, MTC), and vehicle to vehicle (Vehicle to Vehicle, V2V) communication.

The embodiments of the present invention are described with reference to a network device and a terminal device.

The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The UE may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or a terminal device in a future evolved public land mobile network (Public Land Mobile Network, PLMN).

By way of example and not limitation, in the embodiments of the present invention, the terminal device may be a wearable device. The wearable device may be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelry for vital sign monitoring.

In addition, the network device may be a device configured to communicate with a mobile device. The network device may be an access point (Access Point, AP) in a WLAN or a base transceiver station (Base Transceiver Station, BTS) in GSM or may be a NodeB (NodeB, NB) in WCDMA; or further may be an evolutional NodeB (Evolutional Node B, eNB or eNodeB) in LTE, or a regeneration station or an access point, or a vehicular device, a wearable device, a network device in a future 5G network, a network device in a future evolved PLMN network, or the like.

Moreover, in the embodiments of the present invention, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell (Small cell). The small cell herein may include: a metro cell (Metro cell), a micro cell (Micro cell), a pico cell (Pico cell), a femto cell (Femto cell), and the like. These small cells have features of small coverage and low transmit power, and are suitable for providing high-speed data transmission services.

In addition, in an LTE system or a 5G system, a plurality of cells may simultaneously work on a carrier at a same frequency. In some special scenarios, it may also be considered that the concept of carrier is equivalent to the concept of cell. For example, in a carrier aggregation (Carrier Aggregation, CA) scenario, when a secondary component carrier is configured for UE, a carrier index of the secondary component carrier and a cell identity (Cell Identity, Cell ID) of a secondary serving cell operating on the secondary component carrier are both carried. In this case, it may be considered that a concept of a carrier is equivalent to that of a cell, for example, access by UE to a carrier is equivalent to access to a cell.

The method and apparatus provided in the embodiments of the present invention may be applied to the terminal device or the network device. The terminal device or the network device includes a hardware layer, an operating system layer running on the hardware layer, and an application layer running on the operating system layer. The hardware layer includes hardware such as a central processing unit (Central Processing Unit, CPU), a memory management unit Memory Management Unit, MMU), and a memory (also referred to as a main memory). The operating system may be any one or more computer operating systems that implement service processing by using a process (Process), for example, a Linux operating system, a Unix operating system, an Android operating system, an iOS operating system, or a Windows operating system. The application layer includes applications such as a browser, a contact list, word processing software, and instant messaging software. In addition, in the embodiments of the present invention, a specific structure of an execution body of the method provided in the embodiments of the present invention is not particularly limited, provided that a program recording code of the method provided in the embodiments of the present invention is run, so that communication can be performed according to the method provided in the embodiments of the present invention. For example, the execution body of the method provided in the embodiments of the present invention may be a terminal device or a network device, or a function module that is in the terminal device or the network device and that can invoke the program and execute the program.

In addition, aspects or features in the embodiments of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (Compact Disc, CD), a digital versatile disc (Digital Versatile Disc, DVD), a smart card and a flash memory component (for example, erasable programmable read-only memory (Erasable Programmable Read-Only Memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a wireless communications system according to an embodiment of the present invention. As shown in FIG. 1, the communications system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (Frequency Division Duplex, FDD) system, the forward link 118 and the reverse link 120 may use different frequency bands, and the forward link 124 and the reverse link 126 may use different frequency bands.

For another example, in a time division duplex (Time Division Duplex, TDD) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, an antenna group may be designed to communicate with a terminal device in the sector within coverage of the network device 102. The network device may send, by using a single antenna or a plurality of antenna transmit diversities, a signal to all terminal devices in a sector corresponding to the network device. In a process in which the network device 102 communicates with the terminal devices 116 and 122 respectively by using the forward links 118 and 124, a transmit antenna of the network device 102 may improve signal-to-noise ratios of the forward links 118 and 124 through beamforming. In addition, compared with a manner in which the network device sends, by using a single antenna or a plurality of antenna transmit diversities, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain (for example, generate, receive from another communications apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

For example, the communications system 100 may be a PLMN network, or a D2D network, or an M2M network, or another network. FIG. 1 is merely a simplified schematic diagram as an example. The network device may further include another network device, and the another network device is not drawn in FIG. 1.

A frequency domain resource for wireless communication in this embodiment of the present invention is described in detail below.

In this embodiment of the present invention, the frequency domain resource used by the network device and the terminal device for wireless communication (for example, uplink transmission or downlink transmission) is a frequency domain resource used based on a contention mechanism.

For example, the network device and/or the terminal device may detect whether a frequency domain resource having a bandwidth (for example, 20 MHz) is in an idle status currently, or in other words, whether the frequency domain resource is used by another device.

If the frequency domain resource is in the idle status, or in other words, the frequency domain resource is not used by another device, the network device and/or the terminal device may perform communication, for example, uplink transmission or downlink transmission by using the frequency domain resource.

If the frequency domain resource is not in the idle status, or in other words, the frequency domain resource is already used by another device, the network device and/or the terminal device cannot use the frequency domain resource.

It should be noted that, in this embodiment of this application, a specific method and process of the foregoing contention mechanism may be similar to the prior art. Herein, to avoid repetition, detailed descriptions of the method and process are omitted.

By way of example and not limitation, in this embodiment of the present invention, the frequency domain resource (or in other words, a frequency domain resource used by the network device and the terminal device based on a contention mechanism) used by the communications system 100 may also be a licensed spectrum resource. In this embodiment, the communications system 100 is a communications system that can use a licensed band, and communications devices (the network device and/or the terminal device) in the system 100 may use a frequency domain resource of the licensed band in a contention manner.

A "licensed frequency domain resource" may also be referred to as a "licensed spectrum resource" or a "licensed carrier", and is a frequency domain resource that can be used only after being approved by the state or local wireless committee. Different systems, for example, an LTE system and a Wi-Fi system, or systems included in different operators cannot share a licensed frequency domain resource.

The licensed spectrum resource is a spectrum resource that is designated by a radio regulation committee of a government for a special purpose, for example, a spectrum resource that is used by a mobile operator, or a spectrum resource that is exclusively used in civil aviation, railway, and police. Due to policy exclusiveness, service quality of the licensed spectrum resource can be generally ensured, and scheduling control can be relatively easily performed.

In some embodiments, the frequency domain resource used by the communications system 100 (or in other words, the frequency domain resource used by the network device and the terminal device based on the contention mechanism) may be a unlicensed frequency domain resource.

The "unlicensed frequency domain resource" may also be referred to as a "unlicensed spectrum resource" or a "unlicensed carrier", and is a resource that is in a unlicensed band and that can be shared by the communications devices. "Sharing a resource in a unlicensed band" may mean that only indexes such as transmit power and out-of-band leakage are specified for use of a particular spectrum, to ensure that a plurality of devices sharing the frequency band meet a basic coexistence requirement. An operator can implement network capacity offloading by using a unlicensed band resource. However, regulatory requirements on a unlicensed band resource in different regions and different spectrums need to be complied with. These requirements are generally formulated to protect a radar or another common system, and ensure that a plurality of systems do not impose harmful impact to each other as far as possible and fairly coexist, and include a transmit power limitation, an out-of-band leakage index, and indoor and outdoor use limitations, and there are some additional coexistence policies and the like in some regions. For example, the communications devices can use a frequency domain resource in a contention manner or a monitoring manner, for example, a listen before talk (Listen Before Talk, "LBT" for short) specified manner.

The unlicensed spectrum resource is also a spectrum resource that is designated by a related department of a government. However, for the unlicensed spectrum resource, a radio technology, an operation enterprise, and a service life are not limited, and in addition, quality of service using the frequency band is not ensured. A communications device can use a unlicensed spectrum resource for free provided that the communications device meets a requirement on an index such as transmit power or out-of-band leakage. Commonly, a unlicensed spectrum resource is used for communication.

By way of example and not limitation, in this embodiment of the present invention, the unlicensed spectrum resource may include frequency bands near 5 Giga Hertz (Giga Hertz, GHz), frequency bands near 2.4 GHz, frequency bands near 3.5 GHz, and frequency bands near 60 GHz.

By way of example and not limitation, for example, the communications system 100 may use a licensed-assisted access using LTE (Licensed-Assisted Access Using LTE, LAA-LTE) technology of a unlicensed carrier, or use a technology of supporting independent deployment of the communications system in a unlicensed band, for example, Standalone LTE over unlicensed spectrum, or use an LTE advanced in unlicensed spectrums (LTE Advanced in Unlicensed Spectrums, LTE-U) technology on a unlicensed carrier. To be specific, the communications system 100 may independently deploy an LTE system to a unlicensed band, to complete communication by using an LTE air interface protocol in the unlicensed band. The system does not include a licensed band. The LTE system deployed in the unlicensed band may use technologies such as centralized scheduling, interference coordination, and hybrid automatic repeat request (Hybrid Automatic Repeat Request, HARQ). Compared with access technologies such as Wi-Fi, the technologies have better robustness, and can obtain higher spectrum efficiency, and provide larger coverage and better user experience.

Moreover, by way of example and not limitation, in this embodiment, the communications system 100 may use technologies such as licensed-assisted access (Licensed-Assisted Access, LAA), dual connectivity (Dual Connectivity, DC), and unlicensed-assisted access (Standalone). The LAA includes configuring, by using a configuration and a structure of carrier aggregation (Carrier Aggregation, CA) in the existing LTE system and based on communication performed by configuring a carrier (licensed carrier) in a licensed band of an operator, carriers (unlicensed carriers) in a plurality of unlicensed bands and performing communication by using the unlicensed carriers with the assistance of the licensed carrier. To be specific, an LTE device may use a licensed carrier as a primary component carrier (Primary Component Carrier, PCC) or a primary cell (Primary Cell, PCell), and use a unlicensed carrier as a secondary component carrier (Secondary Component Carrier, SCC) or a secondary cell (Secondary Cell, SCell) in a CA manner. The dual connectivity DC technology includes jointly using the licensed carrier and the unlicensed carrier through non-CA or, non-ideal backhaul (backhaul), or includes jointly using a plurality of unlicensed carriers through non-CA. The LTE device may alternatively be directly deployed on the unlicensed carrier through independent deployment.

In addition, it should be noted that information transmission in an LTE system on an unlicensed band may not use a fixed frame structure. Generally, the access network device, for example, a base station or a cell, may determine, after successfully preempting a unlicensed spectrum resource, downlink information transmission duration and/or uplink information transmission duration based on downlink service load and/or uplink service load or another considered factor. Further, after successfully preempting the unlicensed spectrum resource, the access network device may flexibly adjust a quantity of time units including downlink information (that is, downlink time units), a quantity of time units including uplink information (that is, uplink time units), downlink information transmission duration included in each downlink time unit, and uplink information transmission duration included in each uplink time unit.

In addition, a concept of transmission opportunity (Transmission Opportunity, TxOP) is introduced into a frame structure of the LTE system in the unlicensed band. The transmission opportunity may also be referred to as a transmission burst (Transmission Burst). One TxOP may include a downlink transmission burst (Downlink Transmission Burst, DL Transmission Burst) and/or an uplink transmission burst (Uplink Transmission Burst, UL Transmission Burst).

The downlink transmission burst (may also be referred to as: "downlink data transmission burst" or "downlink information transmission burst") may include: information transmission (or in other words, data transmission) performed by using a unlicensed band resource with no need to use the contention mechanism (for example, LBT) after an access network device (for example, an eNB) or a cell (Cell) in the access network device successfully preempts the unlicensed band resource. A time length of one downlink transmission burst is not greater than a maximum time for continuous transmission that can be performed by the access network device (or the cell) on the unlicensed band resource with no need to use the contention mechanism. The maximum time may also be referred to as a maximum channel occupation time (MCOT, Maximum Channel Occupied Time). A length of the MCOT may be related to a regional regulation constraint. For example, in Japan, the MCOT may be equal to 4 ms; and in Europe, the MCOT may be equal to 8 ms, 10 ms, or 13 ms. Alternatively, a length of the MCOT may be related to a contention mechanism used by an interception device (for example, the access network device or the terminal device). Usually, a shorter interception time indicates a shorter MCOT. Further, alternatively, a length of the MCOT may be related to a level of a transmitted service. In the embodiments of the present invention, the MCOT may also depend on another factor. This is not specifically limited.

It should be noted that, in the foregoing descriptions, "information transmission performed by using a unlicensed band resource with no need to use the contention mechanism" may include: after successfully preempting the unlicensed band resource, within an actual time in which information is sent on the unlicensed band resource or within the MCOT, the access network device or the cell does not need to assess whether the unlicensed band resource is available by using the contention mechanism. For example, using a downlink transmission burst included in a first TxOP as an example, from the second subframe in the downlink transmission burst, the base station does not need to re-assess, by using the contention mechanism, whether the unlicensed band resource is available. In other words, before the downlink burst data transmission, whether the unlicensed spectrum resource is available needs to be determined first. Once the downlink transmission burst starts, availability of the unlicensed spectrum resource may not be assessed again, until the downlink burst data transmission ends.

In some embodiments, "information transmission performed by using a unlicensed band resource with no need to use the contention mechanism" may further include: after successfully preempting the unlicensed band resource, within an actual time in which information is sent on the unlicensed band resource or within the MCOT, the access network device or the cell does not need to consider coexistence with an inter-RAT system to use the contention mechanism, but may consider coexistence with an intra-RAT system to use the contention mechanism. Herein, the contention mechanism used for intra-RAT coexistence may be included within the time in which information is sent or included within the MCOT after the unlicensed band resource is preempted, and may be included within a specific time unit (or referred to as an idle time unit). Within the specific time unit, a base station or a cell may stop information transmission (or may stop sending information). Within the specific time unit, the base station or the cell may perform channel interception to re-assess whether the unlicensed spectrum resource is available, or may not perform channel interception, and continue to send information within the time in which information is sent or within the MCOT within the specific time unit. For example, within a time range from starting to ending of the downlink transmission burst, the access network device may stop sending information for a time at any time location. Herein, for the LTE system, a non-LTE system may be considered as an inter-RAT system, for example, a WLAN system, or a system using a Wi-Fi technology; and an LTE system may be considered as an intra-RAT system. Both an LTE system belonging to a same operator or an LTE system belonging to a different operator may be considered as an intra-RAT system. Herein, the LTE system includes a network device and/or a terminal device.

Similarly, the uplink transmission burst (may also be referred to as: "uplink data transmission burst" or "uplink information transmission burst") may include: information transmission performed by using a unlicensed band resource with no need to use the contention mechanism (for example, LBT) after the terminal device successfully preempts the unlicensed band resource. For a single terminal device, a time length of an uplink transmission burst may be not greater than an MCOT on the unlicensed band resource, or may be limited in another manner. The uplink transmission burst may include information transmission of a single user or information transmission of a plurality of users. On a side of the access network device, the uplink transmission burst may be uplink information transmission included in the TxOP.

The "information transmission performed by using the unlicensed band resource with no need to reuse a contention mechanism" on the terminal device side may be understood the same way as that on the access network device side, and details are not described herein again.

For the terminal device, the intra-RAT system may further be understood as that a terminal device has a serving cell or serving access network device the same as that of the terminal device. The uplink transmission burst further includes: information transmission that is performed, after the access network device successfully preempts a unlicensed band resource, by the terminal device from the first uplink subframe and the last uplink subframe that can be scheduled, within a time range in which the access network device performs information transmission by using the unlicensed band with no need to use a contention mechanism and based on a particular time delay (for example, a time delay of 4 ms). For example, a time range from the first uplink subframe to the last uplink subframe is a time range corresponding to the uplink transmission burst. In the embodiments of the present invention, a time length used for the uplink information transmission in the uplink subframe that can be successfully scheduled may be less than 1 ms.

In this embodiment of the present invention, a time length of one TxOP may be not greater than a maximum transmission time length that can be allowed by the downlink transmission burst, or is not greater than a maximum transmission time length that can be allowed by the uplink transmission burst, or is not greater than a sum of the maximum transmission time length allowed by the downlink transmission burst and the maximum time length allowed by the uplink transmission burst, or a time length of one transmission burst may be not greater than an MCOT on the unlicensed band resource. For example, after successfully preempting the unlicensed band resource, a maximum time length in which a given device such as the access network device, the terminal device, or another device can transmit data with no need to use the contention mechanism is 8 ms (corresponding to the MCOT mentioned above). In this case, even though one TxOP includes both a DL transmission burst and a UL transmission burst, a maximum transmission time length of the TxOP (or in other words, Transmission Burst) is still 8 ms. In this case, the uplink transmission burst may use some contention mechanisms that enable the terminal device to easily successfully preempt (or, obtain through contention) the unlicensed band resource.

As described above, the information transmission in the LTE system on the unlicensed band does not have a fixed frame structure, and may include at least one of the following: different downlink transmission bursts may have different duration, different uplink transmission burst may have different duration, downlink transmission bursts included in different TxOPs (which may be or may not be neighboring to each other) may have different duration, and uplink transmission bursts included in different TxOPs may have different duration, that is, different TxOPs may have different duration. In the embodiments of the present invention, duration of the downlink transmission burst includes a time length from a start moment of a downlink burst to an end moment of the downlink burst, and duration of the uplink transmission burst includes a time length from a start moment of an uplink burst to an end moment of the uplink burst.

For ease of understanding and description, the transmission burst is briefly referred to as a "burst" below, the uplink transmission burst is briefly referred to as an "uplink burst" below, and the downlink transmission burst is briefly referred to as a "downlink burst" below.

In this embodiment of the present invention, one transmission burst (uplink transmission burst or downlink transmission burst) may include one or more time units.

In addition, when one transmission burst includes a plurality of time units, the plurality of time units in the transmission burst may be contiguous or non-contiguous (for example, there is a time interval between some neighboring time units). This is not particularly limited in the present invention.

In some embodiments, a plurality of contiguous time units included in each transmission burst have a same time length.

That is, in the embodiments of the present invention, each time unit in a transmission burst may be a complete time unit. The complete time unit means that a time length used for downlink information transmission or uplink information transmission in the time unit is equal to a time length of the time unit.

For example, each time unit in a downlink transmission burst may be a complete time unit. That is, the time units used for downlink information transmission in the downlink transmission burst have a same time length. For another example, each time unit in an uplink transmission burst is a complete time unit. That is, the time units used for uplink information transmission in the uplink transmission burst have a same time length.

Alternatively, In some embodiments, in a plurality of contiguous time units included in each transmission burst, at least two time units have different time lengths.

That is, in the embodiments of the present invention, some time units in a transmission burst may be incomplete time units.

For example, the first time unit in a downlink transmission burst may be an incomplete time unit. This may be understood as that a time length used for downlink information transmission in the first time unit may be less than a length of the first time unit. For example, the time unit is represented by a subframe. In this case, a length of time used for downlink information transmission in the first subframe in a downlink transmission burst may be less than 1 ms. Alternatively, the last time unit in a downlink transmission burst may be an incomplete time unit. This may be understood as that a time length used for downlink information transmission in the last time unit may be less than a length of the last time unit. For example, the time unit is represented by a subframe. In this case, a time used for downlink information transmission in the last subframe in a downlink transmission burst may be less than 1 ms. Alternatively, both the first time unit and the last time unit in a downlink transmission burst are incomplete time units.

For another example, the first time unit in an uplink transmission burst may be an incomplete time unit. This may be understood as that a time length used for uplink information transmission in the first time unit may be less than a length of the first time unit. For example, the time unit is represented by a subframe. In this case, a time used for uplink information transmission in the first subframe in an uplink transmission burst may be less than 1 ms. Alternatively, the last time unit in an uplink transmission burst may be an incomplete time unit. This may be understood as that a time length used for uplink information transmission in the last time unit may be less than a length of the last time unit. For example, the time unit is represented by a subframe. In this case, a time used for uplink information transmission in the last subframe in an uplink transmission burst may be less than 1 ms. Alternatively, both the first time unit and the last time unit in an uplink transmission burst are incomplete time units.

In addition, in the embodiments of the present invention, there may be a time interval between neighboring transmission bursts. For example, after a downlink burst ends, because the access network device may need to re-estimate whether a unlicensed spectrum resource is available, there may be one or more time units between the neighboring transmission bursts.

In the embodiments of the present invention, a time unit in one transmission burst may be used to transmit data of one terminal device, or may be used to transmit data of a plurality of terminal devices. This is not particularly limited in the present invention. For example, a plurality of terminal devices served by one access network device may receive, by using a time unit in one transmission burst in a manner such as frequency division multiplexing, time division multiplexing, or spatial multiplexing, data sent by the access network device. For another example, a plurality of terminal devices served by the access network device may send data to the access network device by using a time unit in one transmission burst in a manner such as frequency division multiplexing, time division multiplexing, or spatial multiplexing.

In the embodiments of the present invention, each transmission burst may be divided (or statically configured or semi-statically configured) in advance. That is, each transmission burst is divided by a higher-layer management device of the communications system and notified to each access network device. Alternatively, a division manner of each transmission burst may be specified in a communication protocol. Alternatively, a division manner of each transmission burst may be prestored in each access network device through factory settings or administrator settings. For example, for a same unlicensed spectrum resource, each access network device may use the unlicensed spectrum resource in a time division multiplexing manner. A specific corresponding time range for use may be divided by the higher-layer management device. In the divided time range for use, channel assessment also needs to be performed to use the unlicensed spectrum resource.

Alternatively, in the embodiments of the present invention, each transmission burst may be determined by each access network device (or dynamically changed). That is, each access network device may determine, through contention, a time unit that can be used, and may use one or more time units that are successfully contended as one or more transmission bursts. For example, the access network device may configure a plurality of time units that are successfully contended into one transmission burst.

Before performing downlink transmission, the network device needs to first determine, for example, through LBT, whether the frequency domain resource scheduled by the network device (for example, a resource that is scheduled by the network device and that is in the unlicensed band) is available. As to a location at which LBT is performed, this is not specifically limited in the present invention.

Before performing uplink transmission, the terminal device needs to first determine, for example, through LBT, whether the frequency domain resource scheduled by the network device (for example, a resource that is scheduled by the network device and that is in the unlicensed band) is available. As to a location at which LBT is performed, this is not specifically limited in the present invention.

In this embodiment of the present invention, time units in one transmission burst may all be time units including a same quantity of symbols.

For example, a length of each time unit in one transmission burst is one subframe.

For another example, a length of each time unit in one transmission burst is two subframes.

In some embodiments, in a plurality of contiguous time units included in each transmission burst, at least two time units have different time lengths.

In other words, in this embodiment of the present invention, at least two of time units in one transmission burst include different quantities of symbols.

For example, a time length of a time unit other than the first time unit and/or the last time unit in one uplink transmission burst is 1 ms (namely, one subframe). In addition, a time length of the first time unit in one transmission burst may be less than 1 ms; a time length of the last time unit in one transmission burst may be less than 1 ms; or the time length of the first time unit in one transmission burst and the time length of the last time unit in one transmission burst are both less than 1 ms. It should be noted that, the time lengths of the first time unit and the last time unit may be the same or different.

For another example, a time length of a time unit in one transmission burst may be any positive integer of symbols, where the integer is less than 8. For example, one transmission burst includes six time units, and time lengths corresponding to the time units are, three symbols, two symbols, two symbols, two symbols, two symbols, and three symbols respectively.

In the embodiments of the present invention, a time unit in one transmission burst may be used to transmit data of one terminal device, or may be used to transmit data of a plurality of terminal devices. This is not particularly limited in the embodiments of the present invention. For example, a plurality of terminal devices served by one access network device may receive, by using a time unit in one transmission burst in a manner such as frequency division multiplexing, time division multiplexing, spatial multiplexing, or code division multiplexing, data sent by the access network device. For another example, a plurality of terminal devices served by one access network device may send data to the access network device by using a time unit in one transmission burst in a manner such as frequency division multiplexing, time division multiplexing, spatial multiplexing, or code division multiplexing.

In the embodiments of the present invention, each transmission burst may be divided (or statically configured or semi-statically configured) in advance. That is, each transmission burst is divided by a higher-layer management device of the communications system and notified to each access network device. In some embodiments, a division manner of each transmission burst may be specified in a communication protocol. Alternatively, a division manner of each transmission burst may be pre-stored in each access network device through factory settings or administrator settings. For example, for a same unlicensed spectrum resource, each access network device may use the unlicensed spectrum resource in a time division multiplexing manner. A specific corresponding time range for use may be divided by the higher-layer management device. In the divided time range for use, channel assessment also needs to be performed to use the unlicensed spectrum resource.

In some embodiments, each transmission burst may be determined by each access network device (or dynamically changed). That is, each access network device may determine, through contention, a time unit that can be used, and may use one or more time units that are successfully contended as one or more transmission bursts. For example, the access network device may configure a plurality of time units that are successfully contended into one transmission burst.

In addition, in some of the embodiments, the network device may only provide one or more unlicensed cells (or, may also be referred to as unlicensed carriers), or, the network device may only provide one or more licensed cells (or, may also be referred to as licensed carriers), or the network device may provide both unlicensed cells and licensed cells. This is not particularly limited in the present invention.

A channel transmission manner of this embodiment of the present invention is described below.

In this embodiment of the present invention, the communications devices (for example, the network device or the terminal device) in the communications system 100 may perform communications by using resources (for example, frequency domain resources) based on a scheduling-free transmission scheme, or perform communication by using resources (for example, frequency domain resources) based on a scheduling manner. This is not particularly limited in this embodiment of the present invention. The scheduling manner and the scheduling-free manner are separately described below.

A. Scheduling Manner

In this embodiment, channel transmission (for example, uplink channel transmission or downlink channel transmission) may be performed based on scheduling of a network device. By way of example and not limitation, a period of the scheduling may be, for example, a transmission time interval (Transmission Time Interval, TTI) or a short transmission time interval (short Transmission Time Interval, sTTI).

An example scheduling procedure may include: a network device sends a control channel, for example, a physical downlink control channel (Physical Downlink Control Channel, PDCCH), or an enhanced physical downlink control channel (Enhanced Physical Downlink Control Channel, EPDCCH), or a physical downlink control channel used for scheduling sTTI transmission (sTTI Physical Downlink Control Channel, sPDCCH). The control channel may carry scheduling information that uses different downlink control information (Downlink Control Information, DCI) formats and that is used for scheduling a physical downlink shared channel (Physical Downlink Shared Channel, PDSCH) or a physical uplink shared channel (Physical Uplink Shared Channel, PUSCH). The scheduling information includes control information such as resource allocation information and a modulation and coding scheme. The terminal device detects the control channel, and receives a downlink data channel or sends an uplink data channel based on the scheduling information carried on the detected control channel. After an sTTI technology is introduced, scheduling information carried on a control channel may indicate receiving of a downlink data channel or sending of an uplink data channel, where the downlink data channel or the uplink data channel has a TTI length of 1 ms (a transmission time length is 1 ms) or a TTL length of less than 1 ms (a transmission time length is less than 1 ms).

B. Scheduling-Free Manner

In some embodiments, to resolve a problem of a large quantity of MTC type services of a future network, and meet service transmission requirements of a low latency and high reliability, a scheduling-free transmission scheme may be used. In this embodiment of the present invention, data transmission may also be scheduling-free. Scheduling-free transmission may be denoted as Grant Free in English. The scheduling-free transmission herein may be specific to uplink data transmission or downlink data transmission. The scheduling-free transmission may be understood as any one or more of the following meanings, a combination of some technical characteristics in a plurality of meanings, or another similar meaning.

The scheduling-free transmission may mean that a network device pre-allocates a plurality of transmission resources and notifies a terminal device of the plurality of transmission resources; when the terminal device needs to transmit uplink data, the terminal device selects at least one transmission resource from the plurality of transmission resources pre-allocated by the network device, and sends the uplink data by using the selected transmission resource; and the network device detects, on one or more of the plurality of pre-allocated transmission resources, the uplink data sent by the terminal device. The detection may be blind detection, or detection performed according to a control domain in the uplink data, or detection performed in another manner.

The scheduling-free transmission may mean that a network device pre-allocates a plurality of transmission resources and notifies a terminal device of the plurality of transmission resources, so that when the terminal device needs to transmit uplink data, the terminal device selects at least one transmission resource from the plurality of transmission resources pre-allocated by the network device, and sends the uplink data by using the selected transmission resource.

The scheduling-free transmission may mean that information about a plurality of pre-allocated transmission resources is obtained; and when uplink data needs to be transmitted, at least one transmission resource is selected from the plurality of transmission resources, and the uplink data is sent by using the selected transmission resource. The information may be obtained from the network device.

The scheduling-free transmission may refer to a method for implementing uplink data transmission by a terminal device without dynamic scheduling by a network device. The dynamic scheduling may be a scheduling manner in which the network device indicates a transmission resource to the terminal device by using signaling each time the terminal device transmits uplink data. In some embodiments, implementation of uplink data transmission by a terminal device may be understood as a case in which uplink data transmission is allowed to be performed on data of two or more terminal devices on a same time-frequency resource. In some embodiments, the transmission resource may be transmission resources of one or more transmission time units after a moment at which the terminal device receives the signaling. A transmission time unit may be a minimum time unit in one transmission, for example, a TTI.

The scheduling-free transmission may be uplink data transmission performed when the terminal device does not need to be scheduled by the network device. The scheduling may mean that the terminal device sends an uplink scheduling request to the network device, and after receiving the scheduling request, the network device sends an uplink grant to the terminal device. The uplink grant indicates an uplink transmission resource allocated to the terminal device.

The scheduling-free transmission may be a contention transmission manner, which may specifically mean that a plurality of terminals simultaneously transmit uplink data on a same pre-allocated time-frequency resource, without scheduling by the base station.

The data may include service data or signaling data.

The blind detection may be understood as detection performed, when whether any data arrives is unknown in advance, on data that may arrive. The blind detection may also be understood as detection performed without an explicit signaling indication.

By way of example and not limitation, in this embodiment, a basic time unit of scheduling-free transmission may be one TTI (for example, including the foregoing sTTI). After the sTTI technology is introduced, the scheduling-free transmission may include receiving on a downlink data channel or sending on an uplink data channel, where the downlink data channel or the uplink data channel has a TTI length of 1 ms (a transmission time length is 1 ms) or a TTI length of less than 1 ms (a transmission time length is less than 1 ms).

In this embodiment, the system frequency domain resource used by the communications system 100 may be a resource having a specified bandwidth in the foregoing licensed frequency domain resource or in the unlicensed frequency domain resource. By way of example and not limitation, the system frequency domain resource may be a spectrum resource having a bandwidth of, for example, 80 MHz in the foregoing licensed frequency domain resource or in the unlicensed frequency domain resource. It should be understood that, a size of the system frequency domain resource listed above is merely an example for description, and the present invention is not limited thereto.

In this embodiment, the system frequency domain resources may all be licensed frequency domain resources, or the system frequency domain resources may all be unlicensed frequency domain resources, or, some of the system frequency domain resources may be licensed frequency domain resources, and other resources in the system frequency domain resources are unlicensed frequency domain resources. This is not particularly limited in the present invention.

In addition, by way of example and not limitation, in this embodiment of the present invention, the system frequency domain resource may be divided into a plurality of subbands. In addition, by way of example and not limitation, each subband may include one or more subcarriers.

In this embodiment of the present invention, bandwidths of a plurality of subbands in the system frequency domain resource may be the same. By way of example and not limitation, for example, a bandwidth of each subband may be, for example, 20 MHz. It should be understood that a size of the subband listed above is merely an example for description. The present invention is not limited thereto. A size of each subbandwidth may be adjusted in any manner based on actual requirements.

In some embodiments, bandwidths of some subbands in the system frequency domain resource may be different. For example, bandwidths of some (one or more) subbands in the system frequency domain resource may be, for example, 20 MHz, and bandwidths of some other (one or more) subbands in the system frequency domain resource may be, for example, 10 MHz. It should be understood that a size of the subband listed above is merely an example for description. The present invention is not limited thereto. A size of each subbandwidth may be adjusted in any manner based on actual requirements.

By way of example and not limitation, in this embodiment of the present invention, the size of the subband width may be determined based on a unit used when the terminal device performs detection (or in other words, contention) on the resource (or in other words, a size of an object on which the terminal device performs detection or contention in one detection or contention process).

For example, in this embodiment of the present invention, a unit used when the terminal device performs detection (or in other words, contention) on the resource is $\alpha$, and a size of the subband width is $\beta$, then a relationship between $\alpha$ and $\beta$ may satisfy: $\beta \leq \alpha$.

In addition, in this embodiment of the present invention, the size of each subband may be determined by the network device and is notified to the terminal device by using signaling, and the like. Alternatively, in this embodiment of the present invention, the size of each subband may alternatively be specified by the communications system or the communications protocol, and this is not particularly limited in the present invention.

By way of example and not limitation, in this embodiment of the present invention, each TTI in the communications system may include X (at least two) time domain startpoints, $X \geq 2$.

In addition, by way of example and not limitation, for example, a quantity of time domain startpoints included in each TTI may be the same as a quantity of timeslots included in each TTI.

Specifically, in this embodiment of the present invention, the network device or the terminal device may use a startpoint of any timeslot in one TTI (or in other words, any time domain startpoint of the TTI) as a start moment at which transmission is performed by using the TTI.

In the prior art, each TTI includes only one time domain startpoint, that is, a startpoint of a first timeslot in the TTI. To be specific, before a time domain startpoint of a TTI (for ease of understanding and description, denoted as a TTI #1 below), if the network device or the terminal device cannot determine that the TTI #1 can be obtained through contention (specifically, a frequency domain resource that is on the TTI #1 and that is used based on a contention mechanism), the network device or the terminal device cannot use the TTI #1.

On the contrary, in this embodiment of the present invention, if the network device or the terminal device obtains the TTI #1 (specifically, the frequency domain resource that is on the TTI #1 and that is used based on the contention mechanism) through contention before a time domain startpoint of the TTI #1 (for ease of understanding and description, denoted as a time domain startpoint #1 below), the network device or the terminal device may perform communication by using the TTI #1 (specifically, the frequency domain resource that is on the TTI #1 and that is used based on the contention mechanism) starting from the time domain startpoint #1.

Transmission objects, that is, an uplink channel and a downlink channel, of this embodiment of the present invention are described below by using examples.

By way of example and not limitation, the uplink channel in this embodiment of the present invention may include but is not limited to the following one or more types of information:

1. Uplink data channel, for example, a PUSCH.

In addition, by way of example and not limitation, the PUSCH may include an uplink reference signal and/or uplink data.

2. Uplink control channel. By way of example and not limitation, the uplink control information may include at least one type of the following information:

2-1. Feedback Information

In this embodiment of the present invention, the uplink control information may include feedback information for downlink data.

Specifically, in this embodiment of the present invention, downlink data may be transmitted by using a feedback technology. By way of example and not limitation, the feedback technology may include, for example, a hybrid automatic repeat request (HARQ, Hybrid Automatic Repeat Request) technology.

The HARQ technology is a technology formed by combining forward error correction (Forward Error Correction, FEC) and an automatic repeat request (Automatic Repeat Request, ARQ).

For example, in the HARQ technology, after receiving data from a transmit end, a receive end may determine whether the data is correctly decoded. If the data cannot be accurately decoded, the receive end may feed back negative-acknowledge (Negative-acknowledge, NACK) information to the transmit end, so that the transmit end may determine, based on the NACK information, that the receive end does not accurately receive the data, so that retransmission can be performed. If the data can be accurately decoded, the receive end may send acknowledge (Acknowledge, ACK) information to the transmit end, so that the transmit end may determine, based on the ACK information, that the receive end accurately receives the data, so that it can be determined that data transmission is completed.

In this embodiment of the present invention, when decoding succeeds, the receive end may feedback the ACK information to the transmit end, and may feed back the NACK information to the transmit end when decoding fails.

By way of example and not limitation, in this embodiment of the present invention, the uplink control information may include the ACK information or the NACK information in the HARQ technology.

It should be understood that content included in the feedback information listed above is merely an example for description, and the present invention is not limited thereto. Other information that can indicate a condition of receiving downlink data by the terminal device all falls within the protection scope of the present invention. For example, the feedback information may further include discontinuous transmission (DTX, Discontinuous Transmission) information. The DTX information may be used to indicate that the terminal device does not receive the downlink data.

2-2. Channel Quality Indicator (Channel Quality Indicator, CQI) Information

In this embodiment of the present invention, the CQI may be used to reflect channel quality of a physical downlink shared channel (Physical Downlink Shared Channel, PDSCH). By way of example and not limitation, in this embodiment of the present invention, the channel quality of the PDSCH may be indicated by 0 to 15. 0 indicates poorest channel quality, and 15 indicates best channel quality.

In this embodiment of the present invention, the terminal device may send the CQI information to the network device on a physical uplink control channel (Physical Uplink Control Channel, PUCCH) or a physical uplink shared channel (Physical Uplink Shared Channel, PUSCH). The network device may determine a wireless channel condition of a current PDSCH or PUSCH based on the CQI information, to complete scheduling for the PDSCH. For example, in this embodiment of the present invention, the network device may determine a bit rate, a data amount, or the like of adaptive modulation and coding (Adaptive Modulation and Coding, AMC), a modulation and coding scheme (Modulation and Coding Scheme, MCS), uplink transmission or downlink transmission based on the CQI information.

2-3. Rank Indication (Rank Indication, RI) Information

In this embodiment of the present invention, the RI information may be used to indicate a quantity of valid data layers of the PDSCH, or in other words, the RI information may be used to indicate a quantity of code words (Code Word, CW) that can be currently supported by the terminal device.

2-4. Precoding Matrix Indicator (Precoding Matrix Indicator, PMI) Information

In this embodiment of the present invention, the PMI information may be used to indicate an index (index) of a codebook set. That is, during use of a multiple-antenna technology, for example, a multiple-input multiple-output (multiple-Input Multiple-Output, MIMO) technology, during baseband processing of a PDSCH physical layer, precoding (precoding) based on a precoding matrix is performed. The terminal device may indicate the precoding matrix by using the PMI information, to improve signal quality of the PDSCH.

3. Access Channel, for Example, a Physical Random Access Channel (Physical Random Access Channel, PRACH). By way of example and not limitation, the access channel may be an access channel when the terminal device initiates a call. To be specific, when receiving, for example, a fast physical access channel (Fast Physical Access Channel, FPACH) response message, the terminal device sends a radio resource control connection request (Radio Resource Control Connection Request, RRC Connection Request) message on the PRACH channel based on information indicated by the network device, to establish an RRC connection.

It should be understood that the information carried on the uplink channel listed above is merely an example for description, and the present invention is not limited thereto. Other information that can be transmitted by using the uplink channel in the prior art all falls within the protection scope of the present invention.

By way of example and not limitation, the downlink channel in this embodiment of the present invention may include but is not limited to a downlink data channel, for example, a PDSCH. In addition, by way of example and not limitation, the PDSCH may include a downlink reference signal and/or downlink data.

It should be understood that the information carried on the downlink channel listed above is merely an example for description, and the present invention is not limited thereto. Other information that can be transmitted by using the downlink channel in the prior art all falls within the protection scope of the present invention.

An uplink channel transmission method 200 in an embodiment of the present invention is described in detail below with reference to FIG. 2.

Figure 2:
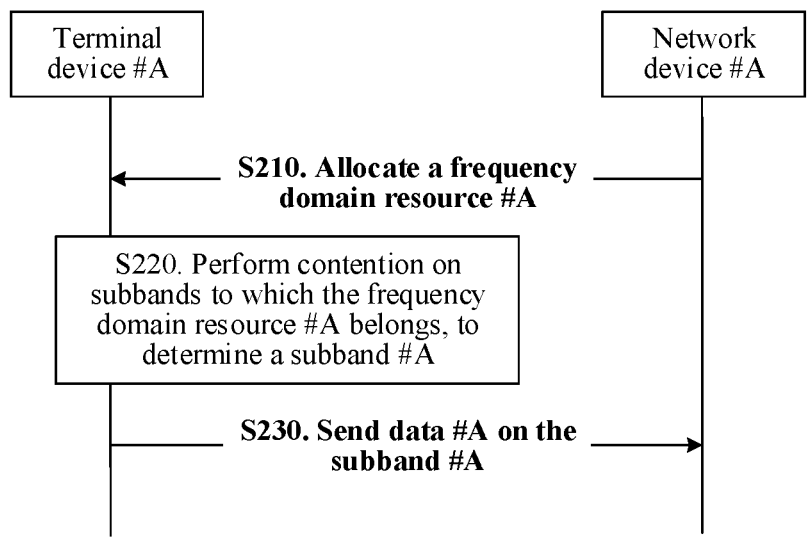
FIG. 2 is a schematic interaction diagram of an uplink channel transmission process according to an embodiment of the present invention.

FIG. 2 schematically shows a process in which an uplink channel #A (that is, an example of uplink data) is transmitted between a network device #A (that is, an example of a network device) and a terminal device #A (that is, an example of a terminal device).

As shown in FIG. 2, in S210, the network device #A may allocate, from the foregoing system frequency domain resource, a time-frequency resource for uplink transmission (for example, including transmission of the uplink channel #A) to the terminal device #A.

There may be a plurality of time-frequency resources. A time-frequency resource #A (that is, an example of a first uplink time-frequency resource) in the plurality of time-frequency resources is allocated by the network device #A to carry the uplink channel #A.

It should be noted that, in this embodiment of the present invention, the network device #A may schedule a plurality of uplink channels for the terminal device #A, or in other words, the network device #A may allocate a plurality of time-frequency resources including the time-frequency resource #A to the terminal device #A, where each time-frequency resource may carry one uplink channel. For ease of understanding and description, without loss of generality, descriptions are provided below by using a processing process performed based on the time-frequency resource #A as an example.

A method and a process for determining the time-frequency resource #A by the network device may be the same as the prior art. Herein, to avoid repetition, detailed descriptions of the method and the process are omitted.

In addition, in this embodiment of the present invention, the network device #A may indicate, by using one or more pieces of scheduling information #A (that is, an example of scheduling information, for example, downlink control information), to the terminal device #A that uplink transmission may be performed by using the time-frequency resource #A.

In this embodiment of the present invention, a manner of using the time-frequency resource #A may be a scheduling-based manner, or a scheduling-free manner. This is not particularly limited in the present invention.

For example, when the manner of using the time-frequency resource #A may be the scheduling-based manner, the time-frequency resource #A may be allocated by the network device #A to the terminal device #A after the network device #A determines that the terminal device #A needs to perform uplink transmission. In addition, the scheduling information #A may be sent by the network device #A to the terminal device #A after the network device #A determines that the terminal device #A needs to perform uplink transmission.

For another example, when the manner of using the time-frequency resource #A may be the scheduling-free manner, the time-frequency resource #A may be allocated by the network device #A to the terminal device #A before the network device #A determines that the terminal device #A needs to perform uplink transmission. In addition, the time-frequency resource #A may be sent by the network device #A to the terminal device #A before the network device #A determines that the terminal device #A needs to perform uplink transmission.

By way of example and not limitation, in this embodiment of the present invention, the scheduling information #A may indicate a size of the time-frequency resource #A. For example, the scheduling information #A may indicate a quantity of time-frequency resource blocks (Resource Block, RB) included in the time-frequency resource #A. For ease of understanding and description, the quantity of the resource blocks is denoted as an RB quantity #A In some embodiments, the scheduling information #A may indicate a size (or in other words, a bandwidth) of a frequency domain resource corresponding to the time-frequency resource #A. For example, the scheduling information #A may indicate a quantity of subcarriers included in the time-frequency resource #A.

In some embodiments, the scheduling information #A may indicate a size of a time domain resource corresponding to the time-frequency resource #A. For example, the scheduling information #A may indicate a quantity of symbols included in the time-frequency resource #A.

By way of example and not limitation, in this embodiment of the present invention, the scheduling information #A may further indicate a location of the time-frequency resource #A in the system frequency domain resource.

By way of example and not limitation, in this embodiment of the present invention, the scheduling information #A may further indicate an index that is of a modulation and coding scheme (Modulation and Coding Scheme, MCS) and that is used by the terminal device when the terminal device performs uplink transmission by using the time-frequency resource #A. For ease of understanding and description, the index of the modulation and coding scheme is denoted as an MCS index #A.

It should be understood that, a function (or in other words, indicated content) of the scheduling information #A listed above is merely an example for description, and this is not particularly limited in the present invention. The function of the scheduling information #A may be similar to a function of information (for example, downlink control information or resource scheduling information) used to indicate a related parameter of uplink transmission in the prior art. For example, the scheduling information #A may also be information used to indicate a related parameter used when the terminal device performs uplink transmission in the prior art.

In this embodiment of the present invention, the time-frequency resource #A occupies at least two (that is, M) subbands in frequency domain. In this embodiment of the present invention, the time-frequency resource #A occupies at least two (that is, M) subbands in frequency domain, or in other words, RBs included in the time-frequency resource #A are located in at least two subbands in frequency domain, or in other words, subcarriers included in the time-frequency resource #A are located in at least two subbands.

It should be noted that, in this embodiment of the present invention, "the time-frequency resource #A occupies at least two (that is, M) subbands in frequency domain" may mean that frequency domain resources corresponding to the time-frequency resource #A are distributed in M subbands.

Specifically, in this embodiment of the present invention, each subband may include a plurality of frequency domain resources.

In addition, in this embodiment of the present invention, the time-frequency resource #A may include a plurality of frequency domain resources.

The plurality of frequency domain resources in the time-frequency resource #A are formed by frequency domain resources in each of the M subbands.

For example, the time-frequency resource #A may include some of the frequency domain resources in each of the M subbands.

Alternatively, the time-frequency resource #A may include all of the frequency domain resources in each of the M subbands.

Alternatively, frequency domain resources that are located in a subband m in the M subbands and that are included in the time-frequency resource #A may be some of frequency domain resources in the subband m, where m☐[1, M].

Alternatively, frequency domain resources that are located in a subband m in the M subbands and that are included in the time-frequency resource #A may be all of frequency domain resources in the subband m, where m☐[1, M].

To be specific, in this embodiment of the present invention, that the time-frequency resource #A occupies at least two subbands may mean that the time-frequency resource #A occupies all resources in the at least two subbands. Alternatively, that the time-frequency resource #A occupies at least two subbands may also mean that the time-frequency resource #A occupies some resources in the at least two subbands.

In this embodiment of the present invention, there may be one (that is, case 1) or more (that is, case 2) pieces of scheduling information #A. Specific transmission processes in the foregoing two cases are separately described in detail below.

Case 1

By way of example and not limitation, in this embodiment of the present invention, it may be indicated, by using one piece of scheduling information #A, that the terminal device #A may perform uplink channel transmission (for example, PUSCH transmission) by using the time-frequency resource #A.

In this embodiment of the present invention, the scheduling information #A may be resource allocation information. For example, the scheduling information #A may be further used to indicate a size and a location of the time-frequency resource #A.

In some embodiments, in this embodiment of the present invention, the scheduling information #A may be scheduling information that triggers the terminal device #A to perform uplink transmission by using the time-frequency resource #A. By way of example and not limitation, in this case, the network device #A may pre-notify the terminal device #A of the size and the location of the time-frequency resource #A by using the resource allocation information.

Descriptions of same or similar cases are omitted below to avoid repetition.

In addition, in this embodiment of the present invention, the scheduling information #A may further indicate a transmission parameter used during data transmission by using the time-frequency resource #A.

By way of example and not limitation, the transmission parameter may include but is not limited to:

an MCS index used during data transmission by using the time-frequency resource #A, a transport block size TBS used during data transmission by using the time-frequency resource #A, a modulation order used during data transmission by using the time-frequency resource #A, a bit rate used during data transmission by using the time-frequency resource #A, a redundancy version used during data transmission by using the time-frequency resource #A, an antenna port used during data transmission by using the time-frequency resource #A, a precoding matrix index used during data transmission by using the time-frequency resource #A, and the like.

Case 2

By way of example and not limitation, in this embodiment of the present invention, the network device #A may send P (at least two) pieces of scheduling information #A to the terminal device #A.

In this case, time-frequency resources indicated by all of the P pieces of scheduling information #A form the foregoing time-frequency resource #A, or in other words, subbands occupied by time-frequency resources indicated by all of the P pieces of scheduling information #A (or in other words, subbands to which time-frequency resources indicated by all of the P pieces of scheduling information #A belong) in frequency domain form subbands occupied by the time-frequency resource #A (or in other words, subbands to which the time-frequency resource #A belongs) in frequency domain, where $P \geq 2$.

By way of example and not limitation, in this embodiment of the present invention, time-frequency resources indicated by any two of the P pieces of scheduling information #A may not overlap each other in frequency domain. To be specific, the time-frequency resource #A may be divided into P parts in frequency domain, and each of the P pieces of scheduling information #A indicates one of the P parts.

Alternatively, in this embodiment of the present invention, the time-frequency resources indicated by the P pieces of scheduling information #A may have a nested structure in frequency domain. For example, one of the P pieces of scheduling information #A may indicate all of the time-frequency resource #A (or in other words, all subbands occupied by the time-frequency resource #A), and another of the P pieces of scheduling information #A may indicate a part of the time-frequency resource #A (or in other words, some subbands occupied by the time-frequency resource #A).

It should be noted that, in this embodiment of the present invention, assuming that a time-frequency resource indicated by scheduling information #A, in the P pieces of scheduling information #A is a time-frequency resource i, the scheduling information #A, may further indicate a transmission parameter used during data transmission by using the time-frequency resource i, where i□[1, P].

By way of example and not limitation, the transmission parameter may include but is not limited to:

an MCS index used during data transmission by using the time-frequency resource i, a transport block size used during data transmission by using the time-frequency resource i, a modulation order used during data transmission by using the time-frequency resource i, a bit rate used during data transmission by using the time-frequency resource i, a redundancy version used during data transmission by using the time-frequency resource i, an antenna port used during data transmission by using the time-frequency resource i, a precoding matrix index used during data transmission by using the time-frequency resource i, and the like.

Without loss of generality, for ease of understanding and description, it is assumed below that a bandwidth of the time-frequency resource #A is 80 MHz, the time-frequency resource #A includes four subbands (for ease of understanding and description, the four subbands are denoted below as a subband #1 to a subband #4), and a bandwidth of each subband is 20 MHz.

In this way, in S210, the terminal device #A may determine the time-frequency resource #A used to carry the uplink channel #A. Specifically, the terminal device #A may determine the size (or in other words, the bandwidth) and the location of the time-frequency resource #A in frequency domain, and a quantity and locations of subbands occupied by the time-frequency resource #A.

In S220, the terminal device #A may perform detection (or in other words, contention or monitoring) on the time-frequency resource #A (specifically, subbands occupied by the time-frequency resource #A, for example, the subband #1 to the subband #4), to determine a subband that can be used and that is in the subband #1 to the subband #4. By way of example and not limitation, the "detection" may include clear channel assessment (Clear Channel Assessment), or the "detection" may include LBT.

It should be noted that, in this embodiment of the present invention, the terminal device #A may perform detection by using a subband as a unit. In other words, in this embodiment of the present invention, the terminal device #A may detect whether a subband is available.

In some embodiments, in this embodiment of the present invention, the terminal device #A may perform detection by using a plurality of (at least two) subbands as a unit.

In some embodiments, in this embodiment of the present invention, the terminal device #A may perform detection by using a single-carrier bandwidth of the system as a unit.

By way of example and not limitation, in this embodiment of the present invention, the terminal device #A may perform the foregoing detection (or in other words, contention or monitoring) based on an LBT manner. In addition, the process may be similar to the prior art. Herein, to avoid repetition, detailed descriptions of the process are omitted.

In this way, in S220, the terminal device #A can determine, from the time-frequency resource #A (specifically, the subbands included in the time-frequency resource #A, for example, the subband #1 to the subband #4), a time-frequency resource used by the terminal device #A (that is, an example of the second uplink time-frequency resource; for ease of understanding and distinguishing, the time-frequency resource used by the terminal device #A is denoted as a time-frequency resource #A' below). Alternatively, the terminal device #A can determine a subband occupied by the time-frequency resource #A' (that is, for ease of understanding and description, the subband occupied by the time-frequency resource #A' is denoted as a subband #A below). There may be one or more subbands #A, and this is not particularly limited in the present invention. In addition, frequency domain resources corresponding to the time-frequency resource #A' may be all frequency domain resources in the subband #A, or, the frequency domain resources corresponding to the time-frequency resource #A' may also be some frequency domain resources in the subband #A, and this is not particularly limited in the present invention. Alternatively, in this embodiment of the present invention, M (that is, a quantity of subbands occupied by the time-frequency resource #A) may be greater than K (that is, a quantity of subbands occupied by the time-frequency resource #A'), or M may also be equal to K, and this not particularly limited in the present invention. In addition, processing processes in the foregoing two cases may be similar.

By way of example and not limitation, for example, in the case 2, when the time-frequency resources indicated by the P pieces of scheduling information #A have a nested structure in frequency domain, the terminal device #A may use a subband to which a time-frequency resource #1 (that is, an example of the time-frequency resource #A') belongs as the subband #A. Contention (for example, LBT) performed by the terminal device #A on the subband occupied by the time-frequency resource #1 succeeds. In addition, the time-frequency resource #1 is indicated by one (that is, an example of Q pieces of scheduling information) of the P pieces of scheduling information #A.

For another example, in the case 2, when time-frequency resources indicated by any two of the P pieces of scheduling information #A may not overlap each other in frequency domain, the terminal device #A may use a subband occupied by a time-frequency resource #2 (that is, another example of the time-frequency resource #A') as the subband #A. Contention (for example, LBT) performed by the terminal device #A on the subband to which the time-frequency resource #2 belongs succeeds. In addition, the time-frequency resource #2 includes a plurality of parts. The plurality of parts are respectively indicated by a plurality of (that is, another example of the Q pieces of scheduling information) the P pieces of scheduling information #A. For example, the plurality of parts may have a one-to-one correspondence to the plurality of the P pieces of scheduling information #A, and each part is indicated by corresponding scheduling information.

In S230, the terminal device #A may send the uplink channel #A to the network device #A by using the time-frequency resource #A' in the subband #A.

The transmission process is described in detail below.

First, a transport block size (Transport Block Size, TBS) used when the uplink channel #A is transmitted is described.

By way of example and not limitation, for example, in the foregoing case 1, in this embodiment of the present invention, the terminal device #A may further store a mapping relationship table (for example, an MCS table). The mapping relationship table may be used to indicate a mapping relationship between a plurality of parameter sets and a plurality of transport block sizes (Transport Block Size, TBS). Each parameter set includes an RB quantity value and an MCS index.

In addition, as stated above, the scheduling information #A may also be used to indicate an RB quantity #A (for example, a quantity of RBs included in the time-frequency resource #A) and an MCS index #A, so that the terminal device #A may search, in the mapping relationship table based on the RB quantity #A and the MCS index #A, for a TBS (for ease of understanding and description, denoted as a TBS #A below) corresponding to the RB quantity #A and the MCS index #A.

In other words, the TBS #A may be a TBS allocated by the network device #A to the terminal device #A for performing uplink transmission (for example, uplink channel #A transmission) on the time-frequency resource #A.

In this embodiment of the present invention, the terminal device #A and the network device #A may transmit the uplink channel #A on the time-frequency resource #A' by using the TBS #A (that is, an example of a first TBS) (that is, a manner 1), or the terminal device #A and the network device #A may transmit the uplink channel #A on the time-frequency resource #A' by using the TBS #A' (that is, an example of a second TBS) (that is, a manner 2). The foregoing two manners are separately described below in detail.

Manner 1

In some embodiments, in this embodiment of the present invention, the terminal device #A may send the uplink channel #A to the network device #A based on the TBS #A by using the subband #A (specifically, the time-frequency resource #A' in the subband #A).

In other words, in this embodiment of the present invention, the uplink channel #A carries information obtained after channel coding is performed on a TB of the TBS #A.

For example, the terminal device #A may determine the TBS #A and the MCS index #A, and the terminal device #A may determine a modulation order corresponding to the MCS index #A. For ease of understanding and distinguishing, the modulation order corresponding to the MCS index #A is denoted as a modulation order #A below (that is, an example of a first uplink modulation order).

In this way, the terminal device #A may send the uplink channel #A to the network device #A by using the subband #A based on the TBS #A and the modulation order #A. The process may be similar to a method and process for transmitting, by a communications device (a network device or a terminal device), data based on a TBS and an MCS in the prior art. Herein, to avoid repetition, detailed descriptions of the process are omitted.

For another example, the terminal device #A may send the uplink channel #A to the network device #A based on the TBS #A and a modulation order #A' by using the subband #A (specifically, the time-frequency resource #A' in the subband #A).

The modulation order #A is different from the modulation order #A'.

By way of example and not limitation, the modulation order #A' may be greater than the modulation order #A.

By way of example and not limitation, the modulation order #A' may be determined by the terminal device #A.

For example, the terminal device #A may determine the modulation order #A' based on the time-frequency resource #A'.

Specifically, in this embodiment of the present invention, a quantity of RBs (for ease of understanding and description, denoted as an RB quantity #A' below) included in the time-frequency resource #A' is less than a quantity of RBs (that is, an RB quantity #A) included in the time-frequency resource #A. In other words, a quantity of resources that can be used by the terminal device #A to send the uplink channel #A is reduced. Therefore, the terminal device #A may increase a modulation order (that is, a modulation order #N) for the uplink channel #A, so that a bit rate used when the terminal device #A sends the uplink channel #A by using the time-frequency resource #A' based on the modulation order #A' is less than a bit rate used when the terminal device #A sends the uplink channel #A by using the time-frequency resource #A' based on the modulation order #A.

In this case, the terminal device #A may further send indication information of the modulation order #A' (for example, indication information of an MCS index corresponding to the modulation order #N) to the network device #A, so that the network device #A can determine the modulation order #A', and parse, based on the modulation order #B and the TBS #A, a signal received by using the time-frequency resource #A', to obtain the uplink channel #A. The process may be similar to a method and process for parsing, by a communications device (a network device or a terminal device), a signal based on a TBS and a modulation order, to obtain data in the prior art. Herein, to avoid repetition, detailed descriptions of the process are omitted.

It should be understood that, the process for determining the modulation order #A' listed above is merely an example for description, and the present invention is not limited thereto.

For example, the modulation order #A' may also be specified by a communications system. By way of example and not limitation, in this embodiment of the present invention, the communications system may specify a modulation order #X. The modulation order #X is a modulation order used when a communications device (for example, a network device or a terminal device) performs communication based on an actually used time-frequency resource when the actually used time-frequency resource is a part of a pre-scheduled time-frequency resource. In this way, the terminal device #A or the network device #A may use the modulation order #X as the modulation order #A'.

For another example, the modulation order #A' may also be pre-indicated by the network device. By way of example and not limitation, in this embodiment of the present invention, the network device may indicate the modulation order #X to the terminal device by using, for example, RRC signaling. The modulation order #X is a modulation order used when a communications device (for example, a network device or a terminal device) performs communication based on an actually used time-frequency resource when the actually used time-frequency resource is a part of a pre-scheduled time-frequency resource. In this way, the terminal device #A or the network device #A may use the modulation order #X as the modulation order #A'.

For another example, the modulation order #A' may also be indicated by the network device to the terminal device by using the scheduling information #A. Specifically, when channel transmission is performed by using a time-frequency resource used based on a contention mechanism, the network device may expect that the terminal device may not obtain all scheduled time-frequency resources through contention. In this case, the network device may predetermine the modulation order #X. The modulation order #X is a modulation order used when a communications device (for example, a network device or a terminal device) performs communication based on an actually used time-frequency resource when the actually used time-frequency resource is a part of a pre-scheduled time-frequency resource. In this way, the network device may indicate the modulation order #X by using, for example, scheduling information when allocating a time-frequency resource to the terminal device. In this way, the terminal device #A or the network device #A may use the modulation order #X as the modulation order #A'.

For another example, in this embodiment of the present invention, the network device or the communications system may pre-specify a plurality of (for example, two) MCS sets (or MCS configuration sets), where each MCS set includes at least one MCS index.

In addition, the network device and the terminal device may determine a modulation order corresponding to an MCS index included in each MCS set. For example, one MCS set may be a correspondence entry. The correspondence entry may be used to indicate a modulation order corresponding to each MCS index included in the MCS set.

In this case, the network device or the terminal device may select one MCS set from the plurality of MCS sets as an MCS set used during uplink channel transmission by using the time-frequency resource #A'.

For example, in this embodiment of the present invention, the plurality of MCS sets have a correspondence to sizes of a plurality of resources (or in other words, a plurality of quantities of subbands). In this way, the network device and the terminal device may determine an MCS set (for ease of understanding and distinguishing, denoted as an MCS set #0 below) corresponding to a size of the time-frequency resource #A' (or, a quantity of subbands occupied by the time-frequency resource #A') based on the foregoing correspondence. In this way, the network device and the terminal device may use a modulation order corresponding to a currently used MCS index (for example, an MCS index indicated by the network device to the terminal device) indicated by the MCS set #0 as the modulation order #A'.

For another example, in this embodiment of the present invention, the network device or the communications system may pre-specify at least two MCS sets. A first MCS set in the at least two MCS sets is an MCS set used when the terminal device obtains, through contention, all subbands allocated by the network device, and a second MCS set in the at least two MCS sets is an MCS set used when the terminal device obtains, through contention, some subbands allocated by the network device. In this way, the network device and the terminal device may determine, based on a status of contending, by the terminal device, for subbands allocated by the network device (for example, a status of whether subbands occupied by the time-frequency resource #A' are all (or some) of subbands occupied by the time-frequency resource #A), an MCS set used when the modulation order #A' is determined (or in other words, an MCS set used during uplink channel transmission by using the time-frequency resource #A'), so that the network device and the terminal device may determine the modulation order #A' based on the determined MCS set. For example, when the terminal device obtains, through contention, all of subbands allocated by the network device, the terminal device and the network device may determine the modulation order #A' by using the first MCS set. When the terminal device obtains, through contention, some of subbands allocated by the network device, the terminal device and the network device may determine the modulation order #A' by using the second MCS set.

For another example, in this embodiment of the present invention, each TTI may correspond to one MCS set, so that the network device and the terminal device may determine an MCS set corresponding to a TTI to which the time-frequency resource #A' belongs, thereby determining the modulation order A' based on the MCS set determined through the foregoing process.

For another example, in this embodiment of the present invention, when the terminal device #A performs uplink transmission on a plurality of subframes (or TTIs), different MCS sets may be used for different subframes (or TTIs). For example, the network device predefines or pre-configures that the first MCS set is used for the first or first several subframes (or TTIs) in the plurality of subframes (or TTIs), and the second MCS set is used for the remaining at least one subframe (or TTI) including the last subframe (or TTI); or the network device predefines or pre-configures that the second MCS set is used for the first or first several subframes (or TTIs) in the plurality of subframes (or TTIs), and the first MCS set is used for the remaining at least one subframe (or TTI) including the last subframe (or TTI).

For another example, the network device may indicate (for example, by using scheduling information or downlink control information) an MCS set used when the terminal device determines the modulation order #A' (or in other words, an MCS set used during uplink channel transmission by using the time-frequency resource #A'), so that the network device and the terminal device determine the modulation order A' based on the MCS set indicated through the foregoing process.

Manner 2

In some embodiments, in this embodiment of the present invention, the terminal device #A may further determine a quantity of RBs included in the time-frequency resource #A'. For ease of understanding and description, the quantity of the RBs included in the time-frequency resource #A' is denoted as an RB quantity #A' below.

In addition, the terminal device #A may search, in the mapping relationship table based on the MCS index #A and the RB quantity #A', for a TBS (for ease of understanding and description, denoted as a TBS #A' below) corresponding to a parameter set to which the RB quantity #A' and the MCS index #A belong.

In this way, in this embodiment of the present invention, the terminal device #A may send the uplink channel #A to the network device #A by using the time-frequency resource #A' based on the TBS #A'.

In other words, in this embodiment of the present invention, the uplink channel #A carries information obtained after channel coding is performed on a TB of the TBS #A'.

In this case, the terminal device #A may further send indication information of the TBS #A' to the network device #A, so that the network device #A can determine the TBS #A', and parse, based on the TBS #A', a signal received by using the subband #A, to obtain the uplink channel #A. The process may be similar to a method and process for parsing, by a communications device (a network device or a terminal device), a signal based on a TBS, to obtain data in the prior art. Herein, to avoid repetition, detailed descriptions of the process are omitted.

It should be noted that, in this embodiment of the present invention, a modulation order used when the uplink channel #A is transmitted by using the TBS #A' may be the modulation order #A, or may be a modulation order that is determined based on the TBS #A' and that is different from the modulation order #A. This is not particularly limited in the present invention.

It should be noted that, in this embodiment of the present invention, when the terminal device #A performs uplink transmission on a plurality of subframes (or TTIs), different TBSs may be used for different subframes (or TTIs). For example, the network device predefines or pre-configures that the TBS #A' is used for the first or first several subframes (or TTIs) in the plurality of subframes (or TTIs), and the TBS #A is used for the remaining at least one subframe (or TTI) including the last subframe (or TTI); or the network device predefines or pre-configures that the TBS #A is used for the last or last several subframes (or TTIs) in the plurality of subframes (or TTIs), and the TBS #A' is used for the remaining at least one subframe (or TTI) including the first subframe (or TTI).

For another example, the network device predefines or pre-configures that the TBS #A is used for the first or first several subframes (or TTIs) in the plurality of subframes (or TTIs), and the TBS #A' is used for the remaining at least one subframe (or TTI) including the last subframe (or TTI); or the network device predefines or pre-configures that the TBS #A' is used for the last or last several subframes (or TTIs) in the plurality of subframes (or TTIs), and the TBS #A is used for the remaining at least one subframe (or TTI) including the first subframe (or TTI).

For another example, the network device instructs, by using physical layer signaling, the terminal device to use the TBS #A or the TBS #A'.

A process of encoding and mapping the uplink channel #A when the uplink channel #A is sent by using the time-frequency resource #A' is described in detail below.

For example, in this embodiment of the present invention, the terminal device #A may send the uplink channel #A by using the time-frequency resource #A' in a manner of rate matching.

In some embodiments, the terminal device #A sends the uplink channel #A on the time-frequency resource #A' based on the TBS #A and the modulation order #A. The TBS #A and the modulation order #A are determined based on the scheduling information #A. Specifically, the terminal device #A encodes a transport block #A based on the TBS #A, to obtain an encoded uplink data packet #A. The encoding process may include adding cyclic redundancy check (Cyclic Redundancy Check, CRC), encoding, interleaving, rate matching, and the like. The process may be similar to a method and process of encoding by a communications device (a network device or a terminal device) in the prior art. Herein, to avoid repetition, detailed descriptions of the process are omitted. The terminal device #A modulates the encoded uplink data packet #A based on the modulation order #A, and maps modulated symbols to the time-frequency resource #A' in a first-frequency-then-time or first-time-then-frequency order, so that the terminal device #A sends the uplink channel #A by using the time-frequency resource #A'. The uplink channel #A is used to carry the uplink data packet #A.

It should be noted that, a quantity of resources included in the time-frequency resource #A' that can be actually used by the terminal device #A is less than a quantity of resources included in the time-frequency resource #A indicated by the scheduling information #A. When the terminal device #A transmits the uplink channel #A by using the TBS #A and the modulation order #A that are determined based on the scheduling information #A, a bit rate of data transmission is increased due to reduced available resources. When the bit rate is greater than a preset value (for example, 0.931), data transmission performance is greatly affected. To reduce the bit rate of data transmission, In some embodiments, the terminal device #A sends the uplink channel #A on the time-frequency resource #A' based on the TBS #A and the modulation order #A'. The modulation order #A' may be determined based on any manner in the manner 1, or the modulation order #A' is greater than the modulation order #A. In some embodiments, the terminal device #A sends the uplink channel #A on the time-frequency resource #A' based on the TBS #A' and the modulation order #A. The TBS #A' may be determined based on any manner in the manner 2. The modulation order #A is determined based on the scheduling information #A. In some embodiments, the terminal device #A sends the uplink channel #A on the time-frequency resource #A' based on the TBS #A' and the modulation order #A'. The TBS #A' may be determined based on any manner in the manner 2. The modulation order #A' may be determined based on any manner in the manner 1, or the modulation order #A' is greater than the modulation order #A.

It should be noted that, in the foregoing embodiment, the terminal device #A may send the uplink channel #A by using the time-frequency resource #A' in the foregoing manner of rate matching. Details are not described herein again.

For another example, in this embodiment of the present invention, the terminal device #A may send the uplink channel #A by using the time-frequency resource #A' in a manner of data puncturing.

In some embodiments, the terminal device #A sends the uplink channel #A on the time-frequency resource #A' based on the TBS #A and the modulation order #A. The TBS #A and the modulation order #A are determined based on the scheduling information #A. Specifically, the terminal device #A encodes the transport block #A based on the TBS #A, to obtain the encoded uplink data packet #A. The terminal device #A modulates the encoded uplink data packet #A based on the modulation order #A, and maps modulated symbols to the time-frequency resource #A' to obtain second uplink data. The second uplink data is a part that corresponds to the time-frequency resource #A' and that is in first uplink data. The first uplink data is data obtained by mapping the modulated symbols to the time-frequency resource #A in a first-frequency-then-time or first-time-then-frequency order. In this way, the terminal device #A sends the uplink channel #A by using the time-frequency resource #A', where the uplink channel #A is used to carry the second uplink data.

In some embodiments, the terminal device #A sends the uplink channel #A on the time-frequency resource #A' based on the TBS #A and the modulation order #A'. The modulation order #A' may be determined based on any manner in the manner 1, or the modulation order #A' is greater than the modulation order #A. In some embodiments, the terminal device #A sends the uplink channel #A on the time-frequency resource #A' based on the TBS #A' and the modulation order #A. The TBS #A' may be determined based on any manner in the manner 2. The modulation order #A is determined based on the scheduling information #A. In some embodiments, the terminal device #A sends the uplink channel #A on the time-frequency resource #A' based on the TBS #A' and the modulation order #A'. The TBS #A' may be determined based on any manner in the manner 2. The modulation order #A' may be determined based on any manner in the manner 1, or the modulation order #A' is greater than the modulation order #A.

It should be noted that, in the foregoing embodiment, the terminal device #A may send the uplink channel #A by using the time-frequency resource #A' in the foregoing manner of data puncturing. Details are not described herein again.

For another example, in this embodiment of the present invention, when the scheduling information #A schedules that the transport block #A that is transmitted on the time-frequency resource #A and that is determined based on the TBS #A includes a plurality of (for example, at least two) code blocks, that the transport block #A is mapped to the time-frequency resource #A after being encoded and modulated may be: One code block in the transport block #A is mapped to one of a plurality of subbands to which the time-frequency resource #A belongs after being encoded and modulated. It should be noted that, one or more code blocks may be transmitted on one subband. This is not limited in the present invention. After determining, through channel detection, the time-frequency resource #A' that can be used, the terminal device #A may send the uplink channel #A by using the time-frequency resource #A' in the foregoing manner of data puncturing. This is mainly because one code block may have independent CRC information, so that can be independently decoded. The terminal device performs uplink channel transmission in the foregoing manner, so that a code block transmitted by using the time-frequency resource #A' is correctly decoded. In this way, only a code block that cannot be transmitted by using the time-frequency resource #A' needs to be transmitted during retransmission, so that transmission efficiency of the system is improved.

In this embodiment of the present invention, because the time-frequency resource #A' is a part of the time-frequency resource #A, the network device #A may further determine the time-frequency resource #A', to receive the uplink channel on the time-frequency resource #A'. A method for determining the time-frequency resource #A' by the network device #A is described below.

By way of example and not limitation, the time-frequency resource #A' may be determined based on at least one method in the following methods a to c.

Method a

In this embodiment of the present invention, the terminal device #A may send information #1 (that is, an example of first indication information) to the network device #A.

By way of example and not limitation, for example, the information #1 may be used to indicate a size of the subband #A (or in other words, a quantity of subbands included in the subband #A), and a location of the subband #A (specifically, locations of subbands included in the subband #A).

For another example, the information #1 may be used to indicate a size of a subband (for ease of understanding and distinguishing, denoted as a subband #A' below) (or in other words, a quantity of subbands included in the subband #A') other than the subband #A in the subbands occupied by the time-frequency resource #A, and a location of the subband #A' (specifically, locations of subbands included in the subband #A').

In this way, the network device #A can determine the subband #A, so that the network device #A can determine, from the subband #A, the time-frequency resource #A' based on locations of the time-frequency resource #A in the subbands.

In this embodiment of the present invention, the information #1 may indicate the time-frequency resource #A' (for example, a size of the time-frequency resource #A', and a location of the time-frequency resource #A' in the time-frequency resource #A).

In this way, the network device #A can directly determine the time-frequency resource #A' based on the information #1.

Further, the network device #A may receive, only on the subband #A, data sent by the terminal device #A, to reduce processing load of the network device. Herein, a method and process of receiving, by the network device #A, data by using a resource may be similar to the prior art. Herein, to avoid repetition, detailed descriptions of the method and process are omitted.

By way of example and not limitation, in this embodiment of the present invention, the terminal device #A may send the information #1 to the network device #A by using the subband #A.

Alternatively, in this embodiment of the present invention, the terminal device #A may send both the information #1 and the uplink channel #A to the network device #A by using the subband #A in an associated manner.

The foregoing "associated sending" may mean that, in this embodiment of the present invention, the subband #A may correspond to a plurality of time-frequency resource elements (Resource Element, RE), the terminal device #A may send the uplink channel #A by using some of the plurality of REs, and the terminal device #A may send the information #1 to other REs in the plurality of REs.

It should be understood that the resource used by the terminal device #A to send the information #1 to the network device #A listed above is merely an example for description, and this is not particularly limited in the present invention. For example, in this embodiment of the present invention, reserved resources may also be disposed in the communications system. The reserved resources are forbidden to be used for data transmission. Alternatively, the reserved resources may be used only for signaling transmission of the network device and the terminal device, so that the terminal device #A may send the information #1 to the network device #A by using some or all of the reserved resources.

By way of example and not limitation, in this embodiment of the present invention, each subband may include the foregoing reserved resource. In this way, in this embodiment of the present invention, the terminal device #A may send the information #1 to the network device #A on a reserved resource (that is, an example of a third time-frequency resource) in each subband (that is, the subband #A) occupied by the time-frequency resource #A'.

By way of example and not limitation, a location of the reserved resource in each subband may be specified by the communications system, or the location of the reserved resource in each subband may be indicated by the network device to the terminal device by using, for example, RRC signaling, or, the location of the reserved resource in each subband may be indicated by the network device to the terminal device by using scheduling information (for example, the scheduling information #A).

By way of example and not limitation, a size of the reserved resource may be specified by the communications system, or the size of the reserved resource may be indicated by the network device to the terminal device by using, for example, RRC signaling, or, the size of the reserved resource may be determined based on a time-frequency resource (for example, the time-frequency resource #A) indicated by scheduling information (for example, the scheduling information #A) sent by the network device.

By way of example and not limitation, the terminal device may send the information #1 to the network device on the uplink control channel.

By way of example and not limitation, the terminal device may send the information #1 to the network device in a form of a bit or a coded bit.

Alternatively, the terminal device may add the information #1 to a reference signal for transmission to the network device.

Alternatively, the information #1 may also be a preamble or a sequence that can be identified by the network device and the terminal device.

It should be understood that, the specific form of the information #1 (that is, first indication information) listed above is merely an example for description, and the present invention is not limited thereto. Other information forms that can enable the information #1 to complete a function of indicating a time-frequency resource obtained, through contention, by the terminal device all fall within the protection scope of this embodiment of the present invention.

It should be noted that, when the time-frequency resource #A is the same as the time-frequency resource #A', or in other words, when subbands occupied by the time-frequency resource #A' are the same as the subbands occupied by the time-frequency resource #A (that is, when K=M), the terminal device may also send the information #1 to the network device.

Method b

The terminal device #A may send the uplink channel #A and the reference signal #A by using the subband #A. For example, a part of the uplink channel #A and the reference signal #A are carried on each subband in the subband #A.

In this way, the network device #A can determine, by detecting the reference signal #A, that the time-frequency resource #A carries a frequency domain resource of uplink data (that is, the uplink channel #A) sent by the terminal device #A, that is, the subband #A In some embodiments, that the network device #A determines the subband #A by detecting the reference signal #A includes that: the network device detects each of subbands occupied by the time-frequency resource #A, determines whether the subband carries a reference signal, and determines a subband carrying a reference signal as a subband occupied by the time-frequency resource #A', that is, the subband #A.

Further, the network device #A may parse, only on the subband #A, data sent by the terminal device #A, to reduce processing load of the network device. Herein, a method and process of parsing, by the network device #A, data based on a reference signal may be similar to the prior art. Herein, to avoid repetition, detailed descriptions of the method and process are omitted.

Method c

When the time-frequency resource #A is indicated by P (at least two) pieces of scheduling information #A, the terminal device #A may determine information (for ease of understanding, denoted as information #A_1 below) that is used to indicate the subband #A and that is in the P pieces of information #A. In addition, the terminal device #A may report indication information (that is, an example of first indication information) of the information #A_1 to the network device #A, so that the network device #A can determine, based on the indication information of the information #A_1, that the terminal device #A transmits uplink data by using a frequency domain resource indicated by the information #A_1 (or in other words, a subband to which a frequency domain resource indicated by the information #A_1 belongs). In addition, by way of example and not limitation, the information #A_1 may be carried in a reserved resource described in the method a.

Figure 3:
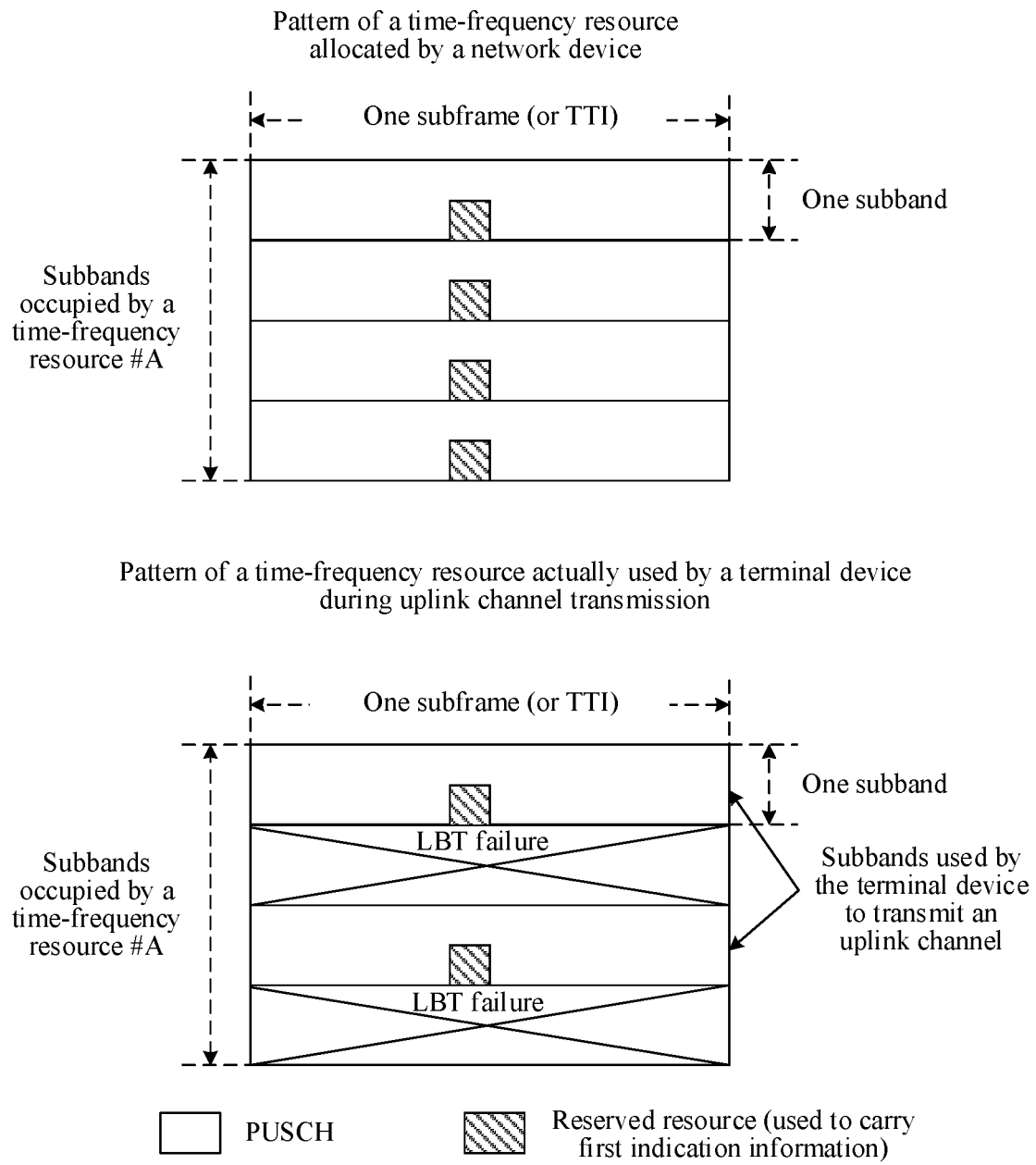
FIG. 3 is a schematic diagram of an example of uplink channel transmission according to an embodiment of the present invention.

FIG. 3 shows a pattern of the time-frequency resource #A' that is actually obtained, through contention, by the terminal device #A in the time-frequency resource #A allocated by the network device #A to the terminal device #A. As shown in FIG. 3, subbands occupied by the time-frequency resource #A' are some of subbands occupied by the time-frequency resource #A. In addition, the foregoing reserved resource may be configured in each subband. The reserved resource may carry indication information (that is, an example of the first indication information) used to indicate whether a subband is obtained by the terminal device through contention.

According to the uplink channel transmission method provided in this embodiment of the present invention, the system frequency domain resource used based on the contention mechanism is divided into a plurality of subbands; in addition, after the first uplink time-frequency resource allocated by the network device is determined, and before uplink transmission needs to be performed, the terminal device detects at least two subbands included in the first uplink time-frequency resource, so that the terminal device determines, from the at least two subbands, the second uplink time-frequency resource that can be used by the terminal device, and performs uplink channel transmission by using the second uplink time-frequency resource. To be specific, compared with the prior art, before using the first uplink time-frequency resource to perform wireless communication, the terminal device does not need to determine that all of resources in a full bandwidth range of the first uplink time-frequency resource can be used. In this way, a possibility that the terminal device can use the first uplink time-frequency resource (specifically, some subbands in the first uplink time-frequency resource) to perform wireless communication can be increased, communication efficiency is improved, a service transmission latency is reduced, and user experience is improved.

A downlink channel transmission method 300 in an embodiment of the present invention is described in detail below with reference to FIG. 4.

Figure 4:
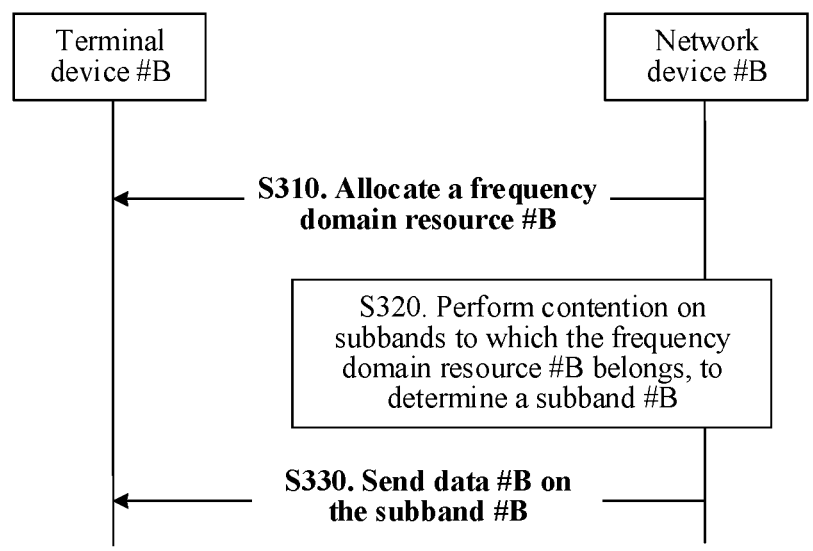
FIG. 4 is a schematic interaction diagram of a downlink channel transmission process according to an embodiment of the present invention.

FIG. 4 schematically shows a process in which a downlink channel #B (that is, an example of a first downlink channel) is transmitted between a network device #B (that is, an example of a network device) and a terminal device #B (that is, an example of a terminal device).

As shown in FIG. 4, in S310, the network device #B may allocate, from the foregoing system frequency domain resource, a time-frequency resource for downlink transmission (for example, including transmission of the downlink channel #B) to the terminal device #B.

There may be a plurality of time-frequency resources. A time-frequency resource #B (that is, an example of a first downlink time-frequency resource) in the plurality of time-frequency resources is allocated by the network device #B to carry the downlink channel #B.

It should be noted that, in this embodiment of the present invention, the network device #B may schedule a plurality of downlink channels for the terminal device #B, or in other words, the network device #B may allocate a plurality of time-frequency resources including the time-frequency resource #B to the terminal device #B, where each time-frequency resource may carry one downlink channel. For ease of understanding and description, without loss of generality, descriptions are provided below by using a processing process performed based on the time-frequency resource #B as an example.

A method and a process for determining the time-frequency resource #B by the network device may be the same as the prior art. Herein, to avoid repetition, detailed descriptions of the method and the process are omitted.

In addition, in this embodiment of the present invention, the network device #B may indicate, by using one or more pieces of control information #B (that is, an example of first control information, for example, downlink control information), to the terminal device #B that downlink transmission may be performed by using the time-frequency resource #B.

In this embodiment of the present invention, a manner of using the time-frequency resource #B may be a scheduling-based manner, or a scheduling-free manner. This is not particularly limited in the present invention.

For example, when the manner of using the time-frequency resource #B may be the scheduling-based manner, the time-frequency resource #B may be allocated by the network device #B to the terminal device #B after the network device #B determines that the terminal device #B needs to perform downlink transmission. In addition, the time-frequency resource #B may be sent by the network device #B to the terminal device #B after the network device #B determines that the terminal device #B needs to perform downlink transmission.

By way of example and not limitation, the control information #B and the downlink data channel may be carried on a same subframe or TTI.

For another example, when the manner of using the time-frequency resource #B may be the scheduling-free manner, the time-frequency resource #B may be allocated by the network device #B to the terminal device #B before the network device #B determines that the terminal device #B needs to perform downlink transmission. In addition, the information #B may be sent by the network device #B to the terminal device #B before the network device #B determines that the terminal device #B needs to perform downlink transmission.

By way of example and not limitation, in this embodiment of the present invention, the control information #B may indicate a size of the time-frequency resource #B. For example, the control information #B may indicate a quantity of RBs included in the time-frequency resource #B. For ease of understanding and description, the quantity of RBs is denoted as an RB quantity #B.

Alternatively, the control information #B may indicate a size (or in other words, a bandwidth) of a frequency domain resource corresponding to the time-frequency resource #B. For example, the control information #B may indicate a quantity of subcarriers included in the time-frequency resource #B.

Alternatively, the control information #B may indicate a size of a time domain resource corresponding to the time-frequency resource #B. For example, the control information #B may indicate a quantity of symbols included in the time-frequency resource #B.

By way of example and not limitation, in this embodiment of the present invention, the control information #B may further indicate a location of the time-frequency resource #B in the system frequency domain resource.

By way of example and not limitation, in this embodiment of the present invention, the control information #B may further indicate an index that is of an MCS and that is used by the terminal device when the terminal device performs downlink transmission by using the time-frequency resource #B. For ease of understanding and description, the index of the MCS is denoted as an MCS index #B.

It should be understood that, a function (or in other words, indicated content) of the control information #B listed above is merely an example for description, and this is not particularly limited in the present invention. The function of the control information #B may be similar to a function of information (for example, downlink control information or resource control information) used to indicate a related parameter of downlink transmission in the prior art. For example, the control information #B may also be information used to indicate a related parameter used when the terminal device performs downlink transmission in the prior art.

In this embodiment of the present invention, the time-frequency resource #B occupies at least two (that is, M) subbands in frequency domain. In this embodiment of the present invention, the time-frequency resource #B occupies at least two (that is, M) subbands in frequency domain, or in other words, RBs included in the time-frequency resource #B are located in at least two subbands in frequency domain, or in other words, subcarriers included in the time-frequency resource #B are located in at least two subbands.

It should be noted that, in this embodiment of the present invention, "the time-frequency resource #B occupies at least two (that is, M) subbands in frequency domain" may mean that frequency domain resources corresponding to the time-frequency resource #B are distributed in M subbands.

Specifically, in this embodiment of the present invention, each subband may include a plurality of frequency domain resources.

In addition, in this embodiment of the present invention, the time-frequency resource #B may include a plurality of frequency domain resources.

The plurality of frequency domain resources in the time-frequency resource #B are formed by frequency domain resources in each of the M subbands.

For example, the time-frequency resource #B may include some of the frequency domain resources in each of the M subbands.

Alternatively, the time-frequency resource #B may include all of the frequency domain resources in each of the M subbands.

Alternatively, frequency domain resources that are located in a subband m in the M subbands and that are included in the time-frequency resource #B may be some of frequency domain resources in the subband m, where m☐[1, M].

Alternatively, frequency domain resources that are located in a subband m in the M subbands and that are included in the time-frequency resource #B may be all of frequency domain resources in the subband m, where m☐[1, M].

To be specific, in this embodiment of the present invention, that the time-frequency resource #B occupies at least two subbands may mean that the time-frequency resource #B occupies all resources in the at least two subbands. Alternatively, that the time-frequency resource #B occupies at least two subbands may also mean that the time-frequency resource #B occupies some resources in the at least two subbands.

In this embodiment of the present invention, there may be one (that is, case A) or more (that is, case B) pieces of control information #B. Specific transmission processes in the foregoing two cases are separately described in detail below.

Case A

By way of example and not limitation, in this embodiment of the present invention, it may be indicated, by using one piece of control information #B, that the terminal device #B may perform downlink channel transmission (for example, PDSCH transmission) by using the time-frequency resource #B.

In this embodiment of the present invention, the control information #B may be resource allocation information. For example, the control information #B may be further used to indicate a size and a location of the time-frequency resource #B.

Alternatively, in this embodiment of the present invention, the control information #B may be control information that triggers the terminal device #B to perform downlink transmission by using the time-frequency resource #B. By way of example and not limitation, in this case, the network device #B may pre-notify the terminal device #B of the size and the location of the time-frequency resource #B by using the resource allocation information.

Descriptions of same or similar cases are omitted below to avoid repetition.

In addition, in this embodiment of the present invention, the control information #B may further indicate a transmission parameter used during data transmission by using the time-frequency resource #B.

By way of example and not limitation, the transmission parameter may include but is not limited to:

an MCS index used during data transmission by using the time-frequency resource #B, a transport block size TBS used during data transmission by using the time-frequency resource #B, a modulation order used during data transmission by using the time-frequency resource #B, a bit rate used during data transmission by using the time-frequency resource #B, a redundancy version used during data transmission by using the time-frequency resource #B, an antenna port used during data transmission by using the time-frequency resource #B, a precoding matrix index used during data transmission by using the time-frequency resource #B, and the like.

Case B

By way of example and not limitation, in this embodiment of the present invention, the network device #B may send P (at least two) pieces of control information #B to the terminal device #B.

In this case, time-frequency resources indicated by all of the P pieces of control information #B form the foregoing time-frequency resource #B, or in other words, subbands occupied by time-frequency resources indicated by all of the P pieces of control information #B (or in other words, subbands to which time-frequency resources indicated by all of the P pieces of control information #B belong) in frequency domain form subbands occupied by the time-frequency resource #B (or in other words, subbands to which the time-frequency resource #B belongs) in frequency domain, where P≥2.

By way of example and not limitation, in this embodiment of the present invention, time-frequency resources indicated by any two of the P pieces of control information #B may not overlap each other in frequency domain. To be specific, the time-frequency resource #B may be divided into P parts in frequency domain, and each of the P pieces of control information #B indicates one of the P parts.

Alternatively, in this embodiment of the present invention, the time-frequency resources indicated by the P pieces of control information #B may have a nested structure in frequency domain. For example, one of the P pieces of control information #B may indicate all of the time-frequency resource #B (or in other words, all subbands occupied by the time-frequency resource #B), and another of the P pieces of control information #B may indicate a part of the time-frequency resource #B (or in other words, some subbands occupied by the time-frequency resource #B).

It should be noted that, in this embodiment of the present invention, assuming that a time-frequency resource indicated by control information #B$_i$ in the P pieces of control information #B is a time-frequency resource i, the control information #B$_i$ may further indicate a transmission parameter used during data transmission by using the time-frequency resource i, where i□[1, P].

By way of example and not limitation, the transmission parameter may include but is not limited to:

an MCS index used during data transmission by using the time-frequency resource i, a transport block size used during data transmission by using the time-frequency resource i, a modulation order used during data transmission by using the time-frequency resource i, a bit rate used during data transmission by using the time-frequency resource i, a redundancy version used during data transmission by using the time-frequency resource i, an antenna port used during data transmission by using the time-frequency resource i, a precoding matrix index used during data transmission by using the time-frequency resource i, and the like.

Without loss of generality, for ease of understanding and description, it is assumed below that a bandwidth of the time-frequency resource #B is 80 MHz, the time-frequency resource #B includes four subbands (for ease of understanding and description, the four subbands are denoted below as a subband #1 to a subband #4), and a bandwidth of each subband is 20 MHz.

In this way, in S310, the network device #B may determine the time-frequency resource #B used to carry the downlink channel #B. Specifically, the network device #B may determine the size (or in other words, the bandwidth) and the location of the time-frequency resource #B in frequency domain, and a quantity and locations of subbands occupied by the time-frequency resource #B.

In S320, the network device #B may perform detection (or in other words, contention or monitoring) on the time-frequency resource #B (specifically, subbands occupied by the time-frequency resource #B, for example, the subband #1 to the subband #4), to determine a subband that can be used and that is in the subband #1 to the subband #4. By way of example and not limitation, the "detection" may include clear channel assessment (Clear Channel Assessment), or the "detection" may include LBT.

It should be noted that, in this embodiment of the present invention, the network device #B may perform detection by using a subband as a unit. In other words, in this embodiment of the present invention, the network device #B may detect whether a subband is available.

Alternatively, in this embodiment of the present invention, the network device #B may perform detection by using a plurality of (at least two) subbands as a unit.

Alternatively, in this embodiment of the present invention, the network device #B may perform detection by using a single-carrier bandwidth of the system as a unit.

By way of example and not limitation, in this embodiment of the present invention, the network device #B may perform the foregoing detection (or in other words, contention or monitoring) based on an LBT manner. In addition, the process may be similar to the prior art. Herein, to avoid repetition, detailed descriptions of the process are omitted.

In this way, in S320, the network device #B can determine, from the time-frequency resource #B (specifically, the subbands included in the time-frequency resource #B, for example, the subband #1 to the subband #4), a time-frequency resource allocated to the terminal device #B for use (that is, an example of the second downlink time-frequency resource; for ease of understanding and distinguishing, the time-frequency resource allocated to the terminal device #B for use is denoted as a time-frequency resource #B' below). Alternatively, the network device #B can determine a subband occupied by the time-frequency resource #B' (that is, for ease of understanding and description, the subband occupied by the time-frequency resource #B' is denoted as a subband #B below). There may be one or more subbands #B, and this is not particularly limited in the present invention. In addition, frequency domain resources corresponding to the time-frequency resource #B' may be all frequency domain resources in the subband #B, or, the frequency domain resources corresponding to the time-frequency resource #B' may also be some frequency domain resources in the subband #B, and this is not particularly limited in the present invention.

In this embodiment of the present invention, the time-frequency resource #B' may be a time-frequency resource on which LBT is performed successfully in the time-frequency resource #B. In addition, In some embodiments, the time-frequency resource #B' may be a part of the time-frequency resource on which LBT is performed successfully in the time-frequency resource #B, or, the time-frequency resource #B' may also be all of the time-frequency resource on which LBT is performed successfully in the time-frequency resource #B. This is not particularly limited in the present invention.

Alternatively, the subband #B may be a subband on which LBT is performed successfully in the M subbands. In addition, In some embodiments, the subband #B may be a part of the subband on which LBT is performed successfully in the M subbands, or the subband #B may be all of the subband on which LBT is performed successfully in the M subbands.

By way of example and not limitation, for example, in the case B, when the time-frequency resources indicated by the P pieces of control information #B have a nested structure in frequency domain, the network device #B may use a subband to which a time-frequency resource #1 (that is, an example of the time-frequency resource #B') belongs as the subband #B. Contention (for example, an LBT) performed by the network device #B on the subband occupied by the time-frequency resource #1 succeeds. In addition, the time-frequency resource #1 is indicated by one (that is, an example of Q pieces of control information) of the P pieces of control information #B.

For another example, in the case 2, when time-frequency resources indicated by any two of the P pieces of control information #B may not overlap each other in frequency domain, the network device #B may use a subband occupied by a time-frequency resource #2 (that is, another example of the time-frequency resource #B') as the subband #B. Contention (for example, LBT) performed by the network device #B on the subband to which the time-frequency resource #2 belongs succeeds. In addition, the time-frequency resource

2 includes a plurality of parts. The plurality of parts are respectively indicated by a plurality of (that is, another example of the Q pieces of control information) the P pieces of control information #B. For example, the plurality of parts may have a one-to-one correspondence to the plurality of the P pieces of control information #B, and each part is indicated by corresponding control information.

In S330, the network device #B may send the downlink channel #B to the terminal device #B by using the time-frequency resource #B' in the subband #B.

The transmission process is described in detail below.

First, a transport block size (Transport Block Size, TBS) used when the downlink channel #B is transmitted is described.

By way of example and not limitation, in this embodiment of the present invention, the network device #B may further store a mapping relationship table (for example, an MCS table). The mapping relationship table may be used to indicate a mapping relationship between a plurality of parameter sets and a plurality of TBSs. Each parameter set includes an RB quantity value and an MCS index.

In addition, as stated above, the control information #B may also be used to indicate an RB quantity #B (for example, a quantity of RBs included in the time-frequency resource #B), and an MCS index #B.

In this embodiment of the present invention, the network device #B may search, in the mapping relationship table based on the RB quantity #B and the MCS index #B, for a TBS (for ease of understanding and description, denoted as a TBS #B below) corresponding to the RB quantity #B and the MCS index #B.

In other words, the TBS #B may be a TBS allocated by the network device #B to the terminal device #B for performing downlink transmission (for example, downlink channel #B transmission) on the time-frequency resource #B.

In other words, in this embodiment of the present invention, the downlink channel #B carries information obtained after channel coding is performed on a TB of the TBS #B.

In this embodiment of the present invention, the terminal device #B and the network device #B may transmit the downlink channel #B on the time-frequency resource #B' by using the TBS #B (that is, an example of a first TBS) (that is, a manner a), or the terminal device #B and the network device #B may transmit the downlink channel #B on the time-frequency resource #B' by using the TBS #B' (that is, an example of a second TBS) (that is, a manner b). The foregoing two manners are separately described below in detail.

Manner a

In some embodiments, in this embodiment of the present invention, the network device #B may send the downlink channel #B to the terminal device #B based on the TBS #B by using the subband #B (specifically, the time-frequency resource #B' in the subband #B).

For example, the network device #B may determine a modulation order corresponding to the MCS index #B based on the MCS index #B. For ease of understanding and distinguishing, the modulation order is denoted as a modulation order #B (that is, an example of a first downlink modulation order) below.

In addition, the network device #B may send the downlink channel #B to the terminal device #B by using the subband #B based on the TBS #B and the modulation order #B. The process may be similar to a method and process for transmitting, by a communications device (a network device or a terminal device), data based on a TBS and an MCS in the prior art. Herein, to avoid repetition, detailed descriptions of the process are omitted.

For another example, the network device #B may send the downlink channel #B to the terminal device #B based on the TBS #B and a modulation order #B' by using the subband #B (specifically, the time-frequency resource #B' in the subband #B).

The modulation order #B is different from the modulation order #B'.

By way of example and not limitation, the modulation order #B' may be greater than the modulation order #B.

By way of example and not limitation, the modulation order #B may be determined by the network device #B.

For example, the network device #B may determine the modulation order #B based on the time-frequency resource #B'.

Specifically, in this embodiment of the present invention, a quantity of RBs (for ease of understanding and description, denoted as an RB quantity #B' below) included in the time-frequency resource #B' is less than a quantity of RBs (that is, an RB quantity #B) included in the time-frequency resource #B. In other words, a quantity of resources that can be used by the network device #B to send the downlink channel #B is reduced. Therefore, the network device #B may increase a modulation order (that is, a modulation order #B') for the downlink channel #B, so that a bit rate used when the network device #B sends the downlink channel #B by using the time-frequency resource #B' based on the modulation order #B' is less than a bit rate used when the network device #B sends the downlink channel #B by using the time-frequency resource #B' based on the modulation order #B.

In this case, the network device #B may further send indication information of the modulation order #B' (for example, indication information of an MCS index corresponding to the modulation order #B) to the terminal device #B, so that the terminal device #B can determine the modulation order #B', and parse, based on the modulation order #B' and the TBS #B, a signal received by using the time-frequency resource #B', to obtain the downlink channel #B. The process may be similar to a method and process for parsing, by a communications device (a network device or a terminal device), a signal based on a TBS and a modulation order, to obtain data in the prior art. Herein, to avoid repetition, detailed descriptions of the process are omitted.

It should be understood that, the process for determining the modulation order #B' listed above is merely an example for description, and the present invention is not limited thereto.

For example, the modulation order #B' may also be specified by a communications system. By way of example and not limitation, in this embodiment of the present invention, the communications system may specify a modulation order #X.

The modulation order #X is: a modulation order used when a communications device (for example, a network device or a terminal device) performs communication based on an actually used time-frequency resource when the actually used time-frequency resource is a part of a pre-scheduled time-frequency resource. In this way, the terminal device #B or the network device #B may use the modulation order #X as the modulation order #B'.

For another example, the modulation order #B' may also be pre-indicated by the network device. By way of example and not limitation, in this embodiment of the present invention, the network device may indicate the modulation order

X to the terminal device by using, for example, RRC signaling. The modulation order #X is a modulation order used when a communications device (for example, a network device or a terminal device) performs communication based on an actually used time-frequency resource when the actually used time-frequency resource is a part of a pre-scheduled time-frequency resource. In this way, the terminal device #B or the network device #B may use the modulation order #X as the modulation order #B'.

For another example, the modulation order #B' may also be indicated by the network device to the terminal device by using the control information #B. Specifically, when channel transmission is performed by using a time-frequency resource used based on a contention mechanism, the network device may expect that the terminal device or the terminal device may not obtain all scheduled time-frequency resources through contention. In this case, the network device may predetermine the modulation order #X. The modulation order #X is a modulation order used when a communications device (for example, a network device or a terminal device) performs communication based on an actually used time-frequency resource when the actually used time-frequency resource is a part of a pre-scheduled time-frequency resource. In this way, the network device may indicate the modulation order #X by using, for example, control information when allocating a time-frequency resource to the terminal device. In this way, the terminal device #B or the network device #B may use the modulation order #X as the modulation order #B'.

For another example, in this embodiment of the present invention, the network device or the communications system may pre-specify a plurality of (for example, two) MCS sets (or MCS configuration sets), where each MCS set includes at least one MCS index.

In addition, the network device and the terminal device may determine a modulation order corresponding to an MCS index included in each MCS set. For example, one MCS set may be a correspondence entry. The correspondence entry may be used to indicate a modulation order corresponding to each MCS index included in the MCS set.

In this case, the network device or the terminal device may select one MCS set from the plurality of MCS sets as an MCS set used during uplink channel transmission by using the time-frequency resource #B'.

For example, in this embodiment of the present invention, the plurality of MCS sets have a correspondence to sizes of a plurality of resources (or in other words, a plurality of quantities of subbands). In this way, the network device and the terminal device may determine an MCS set (for ease of understanding and distinguishing, denoted as an MCS set #0 below) corresponding to a size of the time-frequency resource #B' (or, a quantity of subbands occupied by the time-frequency resource #B') based on the foregoing correspondence. In this way, the network device and the terminal device may use a modulation order corresponding to a currently used MCS index (for example, an MCS index indicated by the network device to the terminal device) indicated by the MCS set #0 as the modulation order #B'.

For another example, in this embodiment of the present invention, the network device or the communications system may pre-specify at least two MCS sets. A first MCS set in the at least two MCS sets is an MCS set used when the network device obtains, through contention, all subbands allocated by the network device to the terminal device, and a second MCS set in the at least two MCS sets is an MCS set used when the network device obtains, through contention, some subbands allocated to the terminal device. In this way, the network device and the terminal device may determine, based on a status of contending, by the terminal device, for subbands allocated by the network device (for example, a status of whether subbands occupied by the time-frequency resource #B' are all (or some) of subbands occupied by the time-frequency resource #B), an MCS set used when the modulation order #B' is determined (or in other words, an MCS set used during uplink channel transmission by using the time-frequency resource #B'), so that the network device and the terminal device may determine the modulation order #B' based on the determined MCS set. For example, when the network device obtains, through contention, all of the subbands allocated by the network device to the terminal device, the terminal device and the network device may determine the modulation order #B' by using the first MCS set. When the network device obtains, through contention, some of the subbands allocated by the network device to the terminal device, the terminal device and the network device may determine the modulation order #B' by using the second MCS set.

For another example, in this embodiment of the present invention, each TTI may correspond to one MCS set, so that the network device and the terminal device may determine an MCS set corresponding to a TTI to which the time-frequency resource #B' belongs, thereby determining the modulation order B' based on the MCS set determined through the foregoing process.

For another example, in this embodiment of the present invention, when the network device #B and the terminal device #B perform downlink transmission on a plurality of subframes (or TTIs), different MCS sets may be used for different subframes (or TTIs). For example, the network device predefines or pre-configures that the first MCS set is used for the first or first several subframes (or TTIs) in the plurality of subframes (or TTIs), and the second MCS set is used for the remaining at least one subframe (or TTI) including the last subframe (or TTI); or the network device predefines or pre-configures that the second MCS set is used for the first or first several subframes (or TTIs) in the plurality of subframes (or TTIs), and the first MCS set is used for the remaining at least one subframe (or TTI) including the last subframe (or TTI).

For another example, the network device may indicate (for example, by using scheduling information or downlink control information) an MCS set used when the terminal device determines the modulation order #B' (or in other words, an MCS set used during uplink channel transmission by using the time-frequency resource #B'), so that the network device and the terminal device determine the modulation order B' based on the MCS set indicated through the foregoing process.

Manner b

In some embodiments, in this embodiment of the present invention, the network device #B may further determine a quantity of RBs included in the time-frequency resource #B'. For ease of understanding and description, the quantity of the RBs included in the time-frequency resource #B' is denoted as an RB quantity #B' below.

In addition, the network device #B may search, in the mapping relationship table based on the MCS index #B and the RB quantity #B', for a TBS (for ease of understanding and description, denoted as a TBS #B' below) corresponding to a parameter set to which the RB quantity #B' and the MCS index #B belong.

In this way, in this embodiment of the present invention, the network device #B may send the downlink channel #B to the terminal device #B by using the time-frequency resource #B' based on the TBS #B'.

In other words, in this embodiment of the present invention, the downlink channel #B carries information obtained after channel coding is performed on a TB of the TBS In this case, the network device #B may further send indication information of the TBS #B' to the terminal device #B, so that the terminal device #B can determine the TBS #B', and parse, based on the TBS #B', a signal received by using the subband #B, to obtain the downlink channel #B. The process may be similar to a method and process for parsing, by a communications device (a network device or a terminal device), a signal based on a TBS, to obtain data in the prior art. Herein, to avoid repetition, detailed descriptions of the process are omitted.

It should be noted that, in this embodiment of the present invention, a modulation order used when the downlink channel #B is transmitted by using the TBS #B' may be the modulation order #B, or may be a modulation order that is determined based on the TBS #B' and that is different from the modulation order #B. This is not particularly limited in the present invention.

It should be noted that, in this embodiment of the present invention, when the network device #B performs downlink transmission on a plurality of subframes (or TTIs), different TBSs may be used for different subframes (or TTIs). For example, the network device predefines or pre-configures that the TBS #B' is used for the first or first several subframes (or TTIs) in the plurality of subframes (or TTIs), and the TBS #B is used for the remaining at least one subframe (or TTI) including the last subframe (or TTI); or the network device predefines or pre-configures that the TBS #B is used for the last or last several subframes (or TTIs) in the plurality of subframes (or TTIs), and the TBS #B' is used for the remaining at least one subframe (or TTI) including the first subframe (or TTI).

For another example, the network device predefines or pre-configures that the TBS #B is used for the first or first several subframes (or TTIs) in the plurality of subframes (or TTIs), and the TBS #B' is used for the remaining at least one subframe (or TTI) including the last subframe (or TTI); or the network device predefines or pre-configures that the TBS #B' is used for the last or last several subframes (or TTIs) in the plurality of subframes (or TTIs), and the TBS #B is used for the remaining at least one subframe (or TTI) including the first subframe (or TTI).

For another example, the network device instructs, by using physical layer signaling, the terminal device to use the TBS #B or the TBS #B'.

A process of encoding and mapping the downlink channel #B when the downlink channel #B is sent by using the time-frequency resource #B' is described in detail below.

For example, in this embodiment of the present invention, the network device #B may send the downlink channel #B by using the time-frequency resource #B' in a manner of rate matching.

In some embodiments, the network device #B sends the downlink channel #B on the time-frequency resource #B' based on the TBS #B and the modulation order #B. The TBS #B and the modulation order #B are determined based on the control information #B. Specifically, the network device #B encodes a transport block #B based on the TBS #B, to obtain an encoded downlink data packet #B. The encoding process may include adding CRC, encoding, interleaving, rate matching, and the like. The process may be similar to a method and process of encoding by a communications device (a network device or a terminal device) in the prior art. Herein, to avoid repetition, detailed descriptions of the process are omitted. The network device #B modulates the encoded downlink data packet #B based on the modulation order #B, and maps modulated symbols to the time-frequency resource #B' in a first-frequency-then-time or first-time-then-frequency order, so that the network device #B sends the downlink channel #B by using the time-frequency resource #B'. The downlink channel #B is used to carry the downlink data packet #B.

It should be noted that, a quantity of resources included in the time-frequency resource #B' that can be actually used by the network device #B is less than a quantity of resources included in the time-frequency resource #B indicated by the control information #B. When the network device #B transmits the downlink channel #B by using the TBS #B and the modulation order #B that are determined based on the control information #B, a bit rate of data transmission is increased due to reduced available resources. When the bit rate is greater than a preset value (for example, 0.931), data transmission performance is greatly affected. To reduce the bit rate of data transmission, In some embodiments, the network device #B sends the downlink channel #B on the time-frequency resource #B' based on the TBS #B and the modulation order #B'. The modulation order #B' may be determined based on any manner in the manner a, or the modulation order #B is greater than the modulation order #B. In some embodiments, the network device #B sends the downlink channel #B on the time-frequency resource #B based on the TBS #B' and the modulation order #B. The TBS #B' may be determined based on any manner in the manner b. The modulation order #B is determined based on the control information #B. In some embodiments, the network device #B sends the downlink channel #B on the time-frequency resource #B' based on the TBS #B' and the modulation order #B'. The TBS #B' may be determined based on any manner in the manner b. The modulation order #B' may be determined based on any manner in the manner a, or the modulation order #B' is greater than the modulation order #B.

It should be noted that, in the foregoing embodiment, the network device #B may send the downlink channel #B by using the time-frequency resource #B' in the foregoing manner of rate matching. Details are not described herein again.

For another example, in this embodiment of the present invention, the network device #B may send the downlink channel #B by using the time-frequency resource #B' in a manner of data puncturing.

In some embodiments, the network device #B sends the downlink channel #B on the time-frequency resource #B' based on the TBS #B and the modulation order #B. The TBS #B and the modulation order #B are determined based on the control information #B. Specifically, the network device #B encodes the transport block #B based on the TBS #B, to obtain the encoded downlink data packet #B. The network device #B modulates the encoded downlink data packet #B based on the modulation order #B, and maps modulated symbols to the time-frequency resource #B' to obtain second downlink data. The second downlink data is a part that corresponds to the time-frequency resource #B' and that is in first downlink data. The first downlink data is data obtained by mapping the modulated symbols to the time-frequency resource #B in a first-frequency-then-time or first-time-then-frequency order. In this way, the network device #B sends the downlink channel #B by using the time-frequency resource #B', where the downlink channel #B is used to carry the second downlink data.

In some embodiments, the network device #B sends the downlink channel #B on the time-frequency resource #B' based on the TBS #B and the modulation order #B'. The modulation order #B' may be determined based on any manner in the manner a, or the modulation order #B' is greater than the modulation order #B. In some embodiments, the network device #B sends the downlink channel #B on the time-frequency resource #B' based on the TBS #B' and the modulation order #B. The TBS #B' may be determined based on any manner in the manner b. The modulation order #B is determined based on the control information #B. In some embodiments, the network device #B sends the downlink channel #B on the time-frequency resource #B' based on the TBS #B' and the modulation order #B'. The TBS #B' may be determined based on any manner in the manner b. The modulation order #B' may be determined based on any manner in the manner a, or the modulation order #B' is greater than the modulation order #B.

It should be noted that, in the foregoing embodiment, the network device #B may send the downlink channel #B by using the time-frequency resource #B' in the foregoing manner of data puncturing. Details are not described herein again.

For another example, in this embodiment of the present invention, when the control information #B schedules that the transport block #B that is transmitted on the time-frequency resource #B and that is determined based on the TBS #B includes a plurality of (for example, at least two) code blocks, that the transport block #B is mapped to the time-frequency resource #B after being encoded and modulated may be: One code block in the transport block #B is mapped to one of a plurality of subbands to which the time-frequency resource #B belongs after being encoded and modulated. It should be noted that, one or more code blocks may be transmitted on one subband. This is not limited in the present invention. After determining, through channel detection, the time-frequency resource #B' that can be used, the network device #B may send the downlink channel #B by using the time-frequency resource #B' in the foregoing manner of data puncturing. This is mainly because one code block may have independent CRC check information, so as to be independently decoded. The network device performs downlink channel transmission in the foregoing manner, so that a code block transmitted by using the time-frequency resource #B' is correctly decoded. In this way, only a code block that cannot be transmitted by using the time-frequency resource #B' needs to be transmitted during retransmission, so that transmission efficiency of the system is improved.

In this embodiment of the present invention, because the time-frequency resource #B' is a part of the time-frequency resource #B, the network device #B may further determine the time-frequency resource #B', to receive the downlink channel on the time-frequency resource #B'. A method for determining the time-frequency resource #B' by the network device #B is described below.

By way of example and not limitation, the time-frequency resource #B' may be determined based on at least one method in the following methods 1 to 3.

Method 1

In this embodiment of the present invention, the network device #B may send control information #C (that is, an example of second control information) to the terminal device #B.

By way of example and not limitation, for example, the control information #C may be used to indicate a size of the subband #B (or in other words, a quantity of subbands included in the subband #B), and a location of the subband #B (specifically, locations of subbands included in the subband #B).

For another example, the control information #C may be used to indicate a size of a subband (for ease of understanding and distinguishing, denoted as a subband #B' below) (or in other words, a quantity of subbands included in the subband #B') other than the subband #B in the subbands occupied by the time-frequency resource #B, and a location of the subband #B' (specifically, locations of subbands included in the subband #B').

In this way, the terminal device #B can determine the subband #B, so that the terminal device #B can determine, from the subband #B, the time-frequency resource #B' based on locations of the time-frequency resource #B in the subbands.

Alternatively, in this embodiment of the present invention, the control information #C may indicate the time-frequency resource #B' (for example, a size of the time-frequency resource #B', and a location of the time-frequency resource #B' in the time-frequency resource #B).

In this way, the terminal device #B can directly determine the time-frequency resource #B' based on the control information #C.

Further, the terminal device #B may receive, only on the subband #B, data sent by the network device #B, to reduce processing load of the network device. Herein, a method and process of receiving, by the terminal device #B, data by using a resource may be similar to the prior art. Herein, to avoid repetition, detailed descriptions of the method and process are omitted.

By way of example and not limitation, in this embodiment of the present invention, the network device #B may send the control information #C to the terminal device #B by using the subband #B.

Alternatively, in this embodiment of the present invention, the network device #B may send both the control information #C and the downlink channel #B to the terminal device #B by using the subband #B in an associated manner.

The foregoing "associated sending" may mean that, in this embodiment of the present invention, the subband #B may correspond to a plurality of REs, the network device #B may send the downlink channel #B by using some of the plurality of REs, and the network device #B may send the control information #C to other REs in the plurality of REs.

It should be understood that the resource used by the network device #B to send the control information #C to the terminal device #B listed above is merely an example for description, and this is not particularly limited in the present invention. For example, in this embodiment of the present invention, reserved resources may also be disposed in the communications system. The reserved resources are forbidden to be used for data transmission. Alternatively, the reserved resources may be used only for signaling transmission of the network device and the terminal device, so that the network device #B may send the control information #C to the terminal device #B by using some or all of the reserved resources.

By way of example and not limitation, in this embodiment of the present invention, each subband may include the foregoing reserved resource. In this way, in this embodiment of the present invention, the network device #B may send the control information #C to the terminal device #B on a reserved resource (that is, an example of a third downlink time-frequency resource) in each subband (that is, the subband #B) occupied by the time-frequency resource #B'.

By way of example and not limitation, a location of the reserved resource in each subband may be specified by the communications system, or the location of the reserved resource in each subband may be indicated by the network device to the terminal device by using, for example, RRC signaling, or, the location of the reserved resource in each subband may be indicated by the network device to the terminal device by using control information (for example, the control information #C).

By way of example and not limitation, a size of the reserved resource may be specified by the communications system, or the size of the reserved resource may be indicated by the network device to the terminal device by using, for example, RRC signaling, or, the size of the reserved resource may be indicated based on control information (for example, the control information #B) sent by the network device.

It should be understood that, the specific form of the control information #C (that is, second control information) listed above is merely an example for description, and the present invention is not limited thereto. Other information forms that can enable the control information #C to complete a function of indicating a time-frequency resource obtained, through contention, by the network device all fall within the protection scope of this embodiment of the present invention.

By way of example and not limitation, the network device may send the control information #C to the terminal device on the downlink control channel.

It should be noted that, the network device may send the control information #B and the control information #C to the terminal device by using one downlink control channel. The network device may also send the control information #B and the control information #C to the terminal device respectively by using two downlink control channels. This is not limited in the present invention.

By way of example and not limitation, the network device may send the control information #C to the terminal device on a downlink data channel.

By way of example and not limitation, the network device may send the control information #C to the terminal device in a form of a bit or a coded bit.

Alternatively, the network device may add the control information #C to a reference signal for transmission to the terminal device.

Alternatively, the network device may indicate the control information #C by using different scramble codes (for example, different RNTI scramble codes) for the downlink control channel.

Alternatively, the control information #C may also be a preamble or a sequence that can be identified by the network device and the terminal device.

It should be understood that, the specific form of the control information #C (that is, second control information) listed above is merely an example for description, and the present invention is not limited thereto. Other information forms that can enable the control information #C to complete a function of indicating a time-frequency resource obtained, through contention, by the network device all fall within the protection scope of this embodiment of the present invention.

It should be noted that, when the time-frequency resource #B is the same as the time-frequency resource #B', or in other words, when subbands occupied by the time-frequency resource #B' are the same as the subbands occupied by the time-frequency resource #B (that is, when K=M), the network device may also send the control information #C to the terminal device.

By way of example and not limitation, in this embodiment of the present invention, the control information #C may be used to indicate the time-frequency resource #B', or the control information #C may be used to indicate a subband occupied by the time-frequency resource #B'. In this way, the terminal device can directly determine, based on the control information #C, the time-frequency resource #B' or the subband occupied by the time-frequency resource #B'.

Alternatively, in this embodiment of the present invention, the control information #C may also be used to indicate a subband that is obtained by the network device through contention (for example, successful LBT) and that is in the foregoing N subbands, so that the terminal device can determine, based on the control information #C and the control information #B, the time-frequency resource #B' or a subband occupied by the time-frequency resource #B'.

Method 2

The network device #B may send the downlink channel #B and the reference signal #B by using the subband #B. For example, the reference signal #B and a part of the downlink channel #B are carried on each subband in the subband #B.

In this way, the terminal device #B can determine, by detecting the reference signal #B, that the time-frequency resource #B carries a frequency domain resource of downlink data (that is, the downlink channel #B) sent by the network device #B, that is, the subband #B.

In some embodiments, that the terminal device #B determines the subband #B by detecting the reference signal #B includes that: the terminal device #B detects each of subbands occupied by the time-frequency resource #B, determines whether the subband carries a reference signal, and determines a subband carrying a reference signal as a subband occupied by the time-frequency resource #B', that is, the subband #B.

Further, the terminal device #B may parse, only on the subband #B, data sent by the network device #B, to reduce processing load of the terminal device. Herein, a method and process of parsing, by the terminal device #B, data based on a reference signal may be similar to the prior art. Herein, to avoid repetition, detailed descriptions of the method and process are omitted.

Method 3

When the time-frequency resource #B is indicated by P (at least two) pieces of control information #B, the terminal device #B may determine information (for ease of understanding, denoted as control information #B_1 below) that is used to indicate the subband #B and that is in the P pieces of information #B. In addition, the network device #B may report indication information (that is, an example of second control information) of the control information #B_1 to the terminal device #B, so that the terminal device #B can determine, based on the indication information of the control information #B_1, that the network device #B transmits downlink data by using a time-frequency resource indicated by the control information #B_1 (or in other words, a subband occupied by a time-frequency resource indicated by the control information #B_1). In addition, by way of example and not limitation, the indication information of the control information #B_1 may be carried in a reserved resource described in the method 1.

Figure 5:
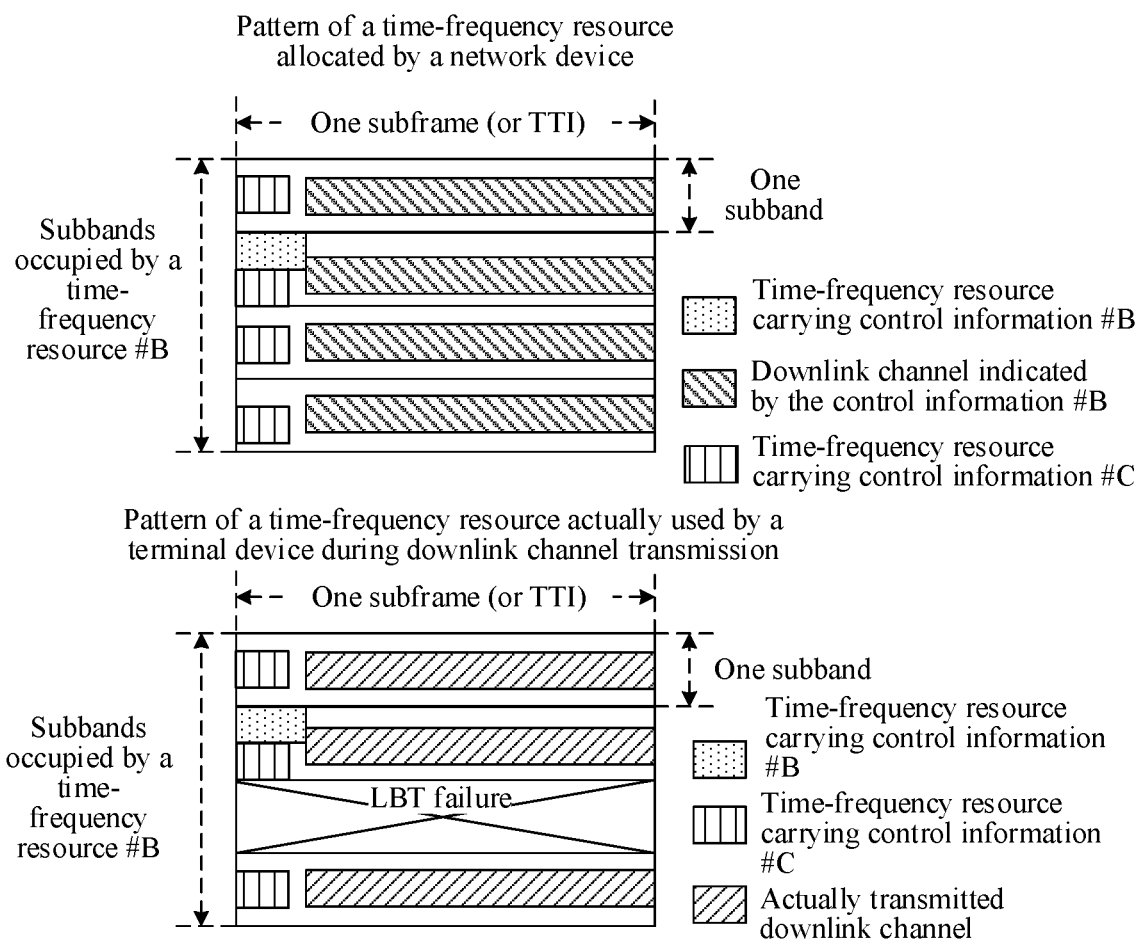
FIG. 5 is a schematic diagram of an example of downlink channel transmission according to an embodiment of the present invention.

FIG. 5 shows a pattern of the time-frequency resource #B' that is actually obtained, through contention, by the network device #B in the time-frequency resource #B allocated by the network device #B to the terminal device #B. As shown in FIG. 5, subbands occupied by the time-frequency resource #B' are some of subbands occupied by the time-frequency resource #B. In addition, the foregoing reserved resource may be configured in each subband. The reserved resource may carry indication information (that is, an example of the second control information) used to indicate whether a subband is obtained by the network device through contention.

According to the downlink channel transmission method in this embodiment of the present invention, the system frequency domain resource used based on the contention mechanism is divided into a plurality of subbands; in addition, after the network device allocates the first downlink frequency domain resource to the terminal device, and before downlink transmission needs to be performed, the network device detects at least two subbands included in the first downlink frequency domain resource, so that the network device determines, from the at least two subbands, the second downlink frequency domain resource that can be used by the network device, and performs downlink channel transmission by using the second downlink frequency domain resource. To be specific, compared with the prior art, before using the first downlink frequency domain resource to perform wireless communication, the network device does not need to determine that all of resources in a full bandwidth range of the first downlink frequency domain resource can be used. In this way, a possibility that the network device can use the first downlink frequency domain resource (specifically, some subbands in the first downlink frequency domain resource) to perform wireless communication can be increased, communication efficiency is improved, a service transmission latency is reduced, and user experience is improved.

It should be understood that the terminal device #A and the terminal device #B described above may be a same terminal device, or may be different terminal devices. This is not particularly limited in the present invention. In other words, in this embodiment of the present invention, one terminal device may be one party performing actions that are performed by the terminal device and that are described in the method 200 and the method 300, and one terminal device may also be both parties performing the actions that are performed by the terminal device and that are described in the method 200 and the method 300.

Similarly, the network device #A and the network device #B described above may be a same network device, or may be different network devices. This is not particularly limited in the present invention. In other words, in this embodiment of the present invention, one network device may be one party performing actions that are performed by the network device and that are described in the method 200 and the method 300, and one network device may also be both parties performing the actions that are performed by the network device and that are described in the method 200 and the method 300.

Figure 6:
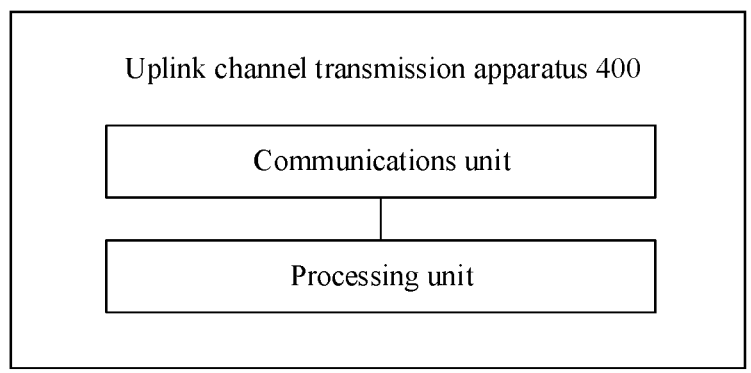
FIG. 6 is a schematic block diagram of an example of an uplink channel transmission apparatus according to an embodiment of the present invention.

FIG. 6 is a schematic block diagram of an uplink channel transmission apparatus 400 according to an embodiment of the present invention. The uplink channel transmission apparatus 400 may correspond to (for example, may be configured in or may be) the terminal device (for example, the terminal device #A) described in the communications system 100, and modules or units in the data transmission apparatus 400 are respectively configured to perform actions or processing processes executed by the terminal device in the communications system 100. Herein, to avoid repetition, detailed descriptions thereof are omitted.

In this embodiment of the present invention, the apparatus 400 may include: a processor and a transceiver, where the processor is communicatively connected to the transceiver. In some embodiments, the device further includes a memory, where the memory is communicatively connected to the processor. In some embodiments, the processor, the memory, and the transceiver may be communicatively connected. The memory may be configured to store instructions. The processor is configured to execute the instructions stored in the memory, to control the transceiver to send information or a signal.

A transceiver unit in the apparatus 400 shown in FIG. 6 may correspond to the transceiver. A processing unit in the apparatus 400 shown in FIG. 6 may correspond to the processor.

Figure 7:
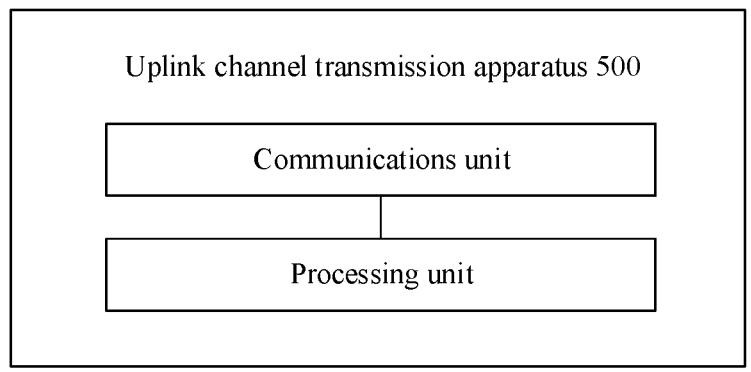
FIG. 7 is a schematic block diagram of another example of an uplink channel transmission apparatus according to an embodiment of the present invention.

FIG. 7 is a schematic block diagram of an uplink channel transmission apparatus 500 according to an embodiment of the present invention. The uplink channel transmission apparatus 500 may correspond to (for example, may be configured in or may be) the network device (for example, the network device #A) described in the communications system 100, and modules or units in the data transmission apparatus 500 are respectively configured to perform actions or processing processes executed by the network device in the communications system 100. Herein, to avoid repetition, detailed descriptions thereof are omitted.

In this embodiment of the present invention, the apparatus 500 may include: a processor and a transceiver, where the processor is communicatively connected to the transceiver. In some embodiments, the device further includes a memory, where the memory is communicatively connected to the processor. In some embodiments, the processor, the memory, and the transceiver may be communicatively connected. The memory may be configured to store instructions. The processor is configured to execute the instructions stored in the memory, to control the transceiver to send information or a signal.

A transceiver unit in the apparatus 500 shown in FIG. 7 may correspond to the transceiver. A processing unit in the apparatus 500 shown in FIG. 7 may correspond to the processor.

Figure 8:
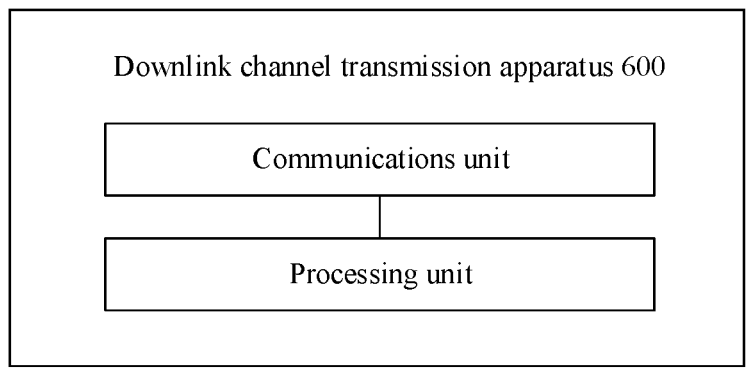
FIG. 8 is a schematic block diagram of an example of a downlink channel transmission apparatus according to an embodiment of the present invention.

FIG. 8 is a schematic block diagram of a downlink channel transmission apparatus 600 according to an embodiment of the present invention. The downlink channel transmission apparatus 600 may correspond to (for example, may be configured in or may be) the network device (for example, the network device #B) described in the method 200, and modules or units in the data transmission apparatus 600 are respectively configured to perform actions or processing processes executed by the network device in the method 200. Herein, to avoid repetition, detailed descriptions thereof are omitted.

In this embodiment of the present invention, the apparatus 600 may include: a processor and a transceiver, where the processor is communicatively connected to the transceiver. In some embodiments, the device further includes a memory, where the memory is communicatively connected to the processor. In some embodiments, the processor, the memory, and the transceiver may be communicatively connected. The memory may be configured to store instructions. The processor is configured to execute the instructions stored in the memory, to control the transceiver to send information or a signal.

A transceiver unit in the apparatus 600 shown in FIG. 8 may correspond to the transceiver. A processing unit in the apparatus 600 shown in FIG. 8 may correspond to the processor.

Figure 9:
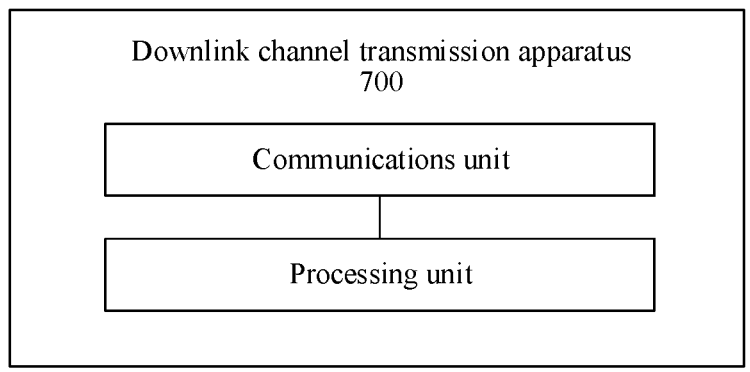
FIG. 9 is a schematic block diagram of another example of a downlink channel transmission apparatus according to an embodiment of the present invention.

FIG. 9 is a schematic block diagram of a downlink channel transmission apparatus 700 according to an embodiment of the present invention. The downlink channel transmission apparatus 700 may correspond to (for example, may be configured in or may be) the terminal device (for example, the terminal device #B) described in the method 200, and modules or units in the downlink channel transmission apparatus 700 are respectively configured to perform actions or processing processes executed by the terminal device in the method 200. Herein, to avoid repetition, detailed descriptions thereof are omitted.

In this embodiment of the present invention, the apparatus 700 may include: a processor and a transceiver, where the processor is communicatively connected to the transceiver. In some embodiments, the device further includes a memory, where the memory is communicatively connected to the processor. In some embodiments, the processor, the memory, and the transceiver may be communicatively connected. The memory may be configured to store instructions. The processor is configured to execute the instructions stored in the memory, to control the transceiver to send information or a signal.

A transceiver unit in the apparatus 700 shown in FIG. 9 may correspond to the transceiver. A processing unit in the apparatus 700 shown in FIG. 9 may correspond to the processor.

It should be noted that the foregoing method embodiments may be applied to a processor or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. An uplink channel transmission method, wherein the method is applied to a communications system comprising a network device and a terminal device, wherein a system frequency domain resource used by the communications system is divided into N subbands and $N \geq 2$, the system frequency domain resource being a frequency domain resource used based on a contention mechanism, and the method comprises:
   receiving, by the terminal device, scheduling information from the network device, wherein the scheduling information indicates uplink time-frequency resources carrying at least one uplink channel, the uplink time-frequency resources being allocated by the network device to the terminal device, wherein a first uplink time-frequency resource in the uplink time-frequency resources carries a first uplink channel in the at least one uplink channel, and the first uplink time-frequency resource occupies M subbands in the N subbands in frequency domain, $N \geq M \geq 2$;
   detecting, by the terminal device, the M subbands, to determine, from the first uplink time-frequency resource, a second uplink time-frequency resource configured to the terminal device, wherein the second uplink time-frequency resource occupies K subbands in the M subbands in frequency domain, $M > K \geq 1$; and
   sending, by the terminal device, the first uplink channel by using the second uplink time-frequency resource.

2. The method according to claim 1, wherein the method further comprises:
   sending, by the terminal device, first indication information to the network device, wherein the first indication information indicates the K subbands occupied by the second uplink time-frequency resource.

3. The method according to claim 2, wherein sending, by the terminal device, the first indication information to the network device comprises:
   determining, by the terminal device, a third uplink time-frequency resource from the second uplink time-frequency resource; and
   sending, by the terminal device, the first indication information by using the third uplink time-frequency resource, wherein
   at least one of a size value of the third uplink time-frequency resource or a location of the third uplink time-frequency resource in the second uplink time-frequency resource is specified by the communications system;
   at least one of a size value of the third uplink time-frequency resource or a location of the third uplink time-frequency resource in the second uplink time-frequency resource is pre-indicated by the network device; or
   at least one of a size value of the third uplink time-frequency resource or a location of the third uplink time-frequency resource in the second uplink time-frequency resource is indicated by the scheduling information.

4. The method according to claim 1, wherein sending, by the terminal device, the first uplink channel by using the second uplink time-frequency resource comprises:
   determining, by the terminal device, a first uplink transport block size (TBS) based on a size of the first uplink time-frequency resource; and
   sending, by the terminal device, the first uplink channel to the network device based on the first uplink TBS by using the second uplink time-frequency resource.

5. The method according to claim 1, wherein sending, by the terminal device, the first uplink channel by using the second uplink time-frequency resource comprises:
   determining, by the terminal device, a second uplink TBS based on a size of the second uplink time-frequency resource; and
   sending, by the terminal device, the first uplink channel to the network device based on the second uplink TBS by using the second uplink time-frequency resource.

6. An uplink channel transmission method, wherein the method is applied to a communications system comprising a network device and a terminal device, wherein a system frequency domain resource used by the communications system is divided into N subbands and $N \geq 2$, the system frequency domain resource being a frequency domain resource used based on a contention mechanism, and the method comprises:
   sending, by the network device, scheduling information to the terminal device, wherein the scheduling information indicates uplink time-frequency resources carrying at least one uplink channel, the scheduling information being allocated by the network device to the terminal device, wherein a first uplink time-frequency resource in the uplink time-frequency resources carries a first uplink channel in the at least one uplink channel, and the first uplink time-frequency resource occupies M subbands in the N subbands in frequency domain, wherein $N \geq M \geq 2$; and
   receiving, by the network device, the first uplink channel from the terminal device by using a second uplink time-frequency resource, wherein the second uplink time-frequency resource occupies K subbands in the M subbands in frequency domain, wherein $M > K \geq 1$.

7. The method according to claim 6, wherein the method further comprises:
  receiving, by the network device, first indication information from the terminal device, wherein the first indication information indicates the K subbands occupied by the second uplink time-frequency resource; and
  determining, by the network device, the second uplink time-frequency resource based on the first indication information.

8. The method according to claim 7, wherein the first indication information is carried on a third uplink time-frequency resource in the second uplink time-frequency resource, wherein
  at least one of a size value of the third uplink time-frequency resource or a location of the third uplink time-frequency resource in the second uplink time-frequency resource is specified by the communications system;
  at least one of a size value of the third uplink time-frequency resource or a location of the third uplink time-frequency resource in the second uplink time-frequency resource is pre-indicated by the network device; or
  at least one of a size value of the third uplink time-frequency resource or a location of the third uplink time-frequency resource in the second uplink time-frequency resource is indicated by the scheduling information.

9. The method according to claim 6, wherein the method further comprises:
  determining, by the network device, the second uplink time-frequency resource based on whether each of the M subbands carries a reference signal.

10. The method according to claim 6, wherein the receiving, by the network device, the first uplink channel from the terminal device by using a second uplink time-frequency resource comprises:
  determining, by the network device, a first uplink transport block size (TBS) based on a size of the first uplink time-frequency resource; and
  receiving, by the network device, the first uplink channel from the terminal device based on the first uplink TBS by using the second uplink time-frequency resource.

11. The method according to claim 6, wherein receiving, by the network device, the first uplink channel from the terminal device by using the second uplink time-frequency resource comprises:
  determining, by the network device, a second uplink TBS based on a size of the second uplink time-frequency resource; and
  receiving, by the network device, the first uplink channel from the terminal device based on the second uplink TBS by using the second uplink time-frequency resource.

12. An uplink channel transmission apparatus, wherein the apparatus is configured in a communications system comprising a network device and the apparatus, a system frequency domain resource used by the communications system is divided into N subbands and $N \geq 2$, the system frequency domain resource being a frequency domain resource used based on a contention mechanism, and the apparatus comprises:
  a transceiver, configured to receive scheduling information from the network device, wherein the scheduling information indicates uplink time-frequency resources carrying at least one uplink channel, uplink time-frequency resources being allocated by the network device to the apparatus, wherein a first uplink time-frequency resource in the uplink time-frequency resources is carries a first uplink channel in the at least one uplink channel, and the first uplink time-frequency resource occupies M subbands in the N subbands in frequency domain, wherein $N \geq M \geq 2$;
  a processor, configured to detect the M subbands, to determine, from the first uplink time-frequency resource, a second uplink time-frequency resource configured to the apparatus, wherein the second uplink time-frequency resource occupies K subbands in the M subbands in frequency domain, $M > K \geq 1$; and
  the transceiver is further configured to send the first uplink channel by using the second uplink time-frequency resource.

13. The apparatus according to claim 12, wherein the transceiver is further configured to send first indication information to the network device, wherein the first indication information indicates the K subbands occupied by the second uplink time-frequency resource.

14. The apparatus according to claim 13, wherein the processor is further configured to determine a third uplink time-frequency resource from the second uplink time-frequency resource; and
  the transceiver is configured to send the first indication information by using the third uplink time-frequency resource, wherein
  at least one of a size value of the third uplink time-frequency resource or a location of the third uplink time-frequency resource in the second uplink time-frequency resource is specified by the communications system.

15. The apparatus according to claim 13, wherein the processor is further configured to determine a third uplink time-frequency resource from the second uplink time-frequency resource; and
  the transceiver is configured to send the first indication information by using the third uplink time-frequency resource, wherein
  at least one of a size value of the third uplink time-frequency resource or a location of the third uplink time-frequency resource in the second uplink time-frequency resource is pre-indicated by the network device.

16. The apparatus according to claim 13, wherein the processor is further configured to determine a third uplink time-frequency resource from the second uplink time-frequency resource; and
  the transceiver is configured to send the first indication information by using the third uplink time-frequency resource, wherein
  at least one of a size value of the third uplink time-frequency resource or a location of the third uplink time-frequency resource in the second uplink time-frequency resource is indicated by the scheduling information.

17. The apparatus according to claim 12, wherein the processor is further configured to determine a first uplink transport block size (TB S) based on a size of the first uplink time-frequency resource; and
  the transceiver is configured to send the first uplink channel to the network device based on the first uplink TBS by using the second uplink time-frequency resource.

18. The apparatus according to claim 13, wherein the processor is further configured to determine a first uplink transport block size (TBS) based on a size of the first uplink time-frequency resource; and the transceiver is configured to send the first uplink channel to the network device based on the first uplink TBS by using the second uplink time-frequency resource.

19. The apparatus according to claim 14, wherein the processor is further configured to determine a first uplink transport block size (TBS) based on a size of the first uplink time-frequency resource; and the transceiver is configured to send the first uplink channel to the network device based on the first uplink TBS by using the second uplink time-frequency resource.

20. The apparatus according to claim 15, wherein the processor is further configured to determine a first uplink transport block size (TBS) based on a size of the first uplink time-frequency resource; and the transceiver is configured to send the first uplink channel to the network device based on the first uplink TBS by using the second uplink time-frequency resource.

* * * * *